US008307046B2

(12) United States Patent
Ortiz et al.

(10) Patent No.: US 8,307,046 B2
(45) Date of Patent: *Nov. 6, 2012

(54) METHOD AND SYSTEM FOR SETTING UP A SYSTEM FOR SHARING IMAGES OVER A COMMUNICATION NETWORK BETWEEN MULTIPLE USERS

(75) Inventors: Juan E. Ortiz, Rochester, NY (US); Mark D. Dawson, Spencerport, NY (US); Dale F. McIntyre, Honeoye Falls, NY (US); Michael J. Telek, Pittsford, NY (US); John K. McBride, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 2796 days.

This patent is subject to a terminal disclaimer.

(21) Appl. No.: 10/174,602

(22) Filed: Jun. 19, 2002

(65) Prior Publication Data
US 2003/0236831 A1 Dec. 25, 2003

(51) Int. Cl.
*G06F 15/16* (2006.01)
(52) U.S. Cl. ........................................................ 709/217
(58) Field of Classification Search .......... 709/204–207, 709/217–219; 715/751–759
See application file for complete search history.

(56) References Cited

U.S. PATENT DOCUMENTS

| 6,161,137 | A  | * | 12/2000 | Ogdon et al. | 709/224 |
| 6,195,091 | B1 | * | 2/2001 | Harple et al. | 715/751 |
| 6,741,586 | B1 | * | 5/2004 | Schuster et al. | 370/352 |
| 6,742,023 | B1 | * | 5/2004 | Fanning et al. | 709/219 |
| 2002/0013852 | A1 | * | 1/2002 | Janik | 709/231 |
| 2002/0057462 | A1 |  | 5/2002 | Wu et al. |  |
| 2002/0103864 | A1 | * | 8/2002 | Rodman et al. | 709/204 |
| 2003/0074404 | A1 | * | 4/2003 | Parker et al. | 709/204 |
| 2005/0120082 | A1 | * | 6/2005 | Hesselink et al. | 709/203 |

FOREIGN PATENT DOCUMENTS

| EP | 0 319 232 | 7/1989 |
| EP | 1 154 630 | 11/2001 |
| WO | WO 01/99407 | 12/2001 |

OTHER PUBLICATIONS

"Consumers Can View, Share Picture On-Line as Kodak Picture Network Goes 'Live'," Business Wire, Aug. 25, 1997, pp. 18-19.*

* cited by examiner

*Primary Examiner* — Benjamin R Bruckart
(74) *Attorney, Agent, or Firm* — Stephen H. Shaw

(57) ABSTRACT

A method for setting up a system for sharing images among a plurality of users in a first image sequence. The method includes providing a plurality of digital images to a controlling computer having software for controlling the sharing of the digital images among a plurality of designated users in the first image sequence; providing a list of list of electronic addresses for the designated users; forwarding an invitation to the designated users for gaining access to the plurality of images over a communication network by the controlling computer; forwarding user software to the designated users that accept the invitation; and automatically forwarding the plurality of digital images in a predetermined sequence to the designated users that accepted the invitation.

20 Claims, 33 Drawing Sheets

METHOD AND SYSTEM FOR SETTING UP A SYSTEM FOR SHARING IMAGES OVER A COMMUNICATION NETWORK BETWEEN MULTIPLE USERS

CROSS REFERENCE TO RELATED APPLICATIONS

U.S. Ser. No. 10/174,595, filed Jun. 19 2002 of Mark Dawson, Juan Ortiz, Dale McIntyre, Mike Telek, and John McBride entitled "METHOD AND SYSTEM FOR SHARING IMAGES OVER A COMMUNICATION NETWORK BETWEEN MULTIPLE USERS";

U.S. Ser. No. 10/174,597, filed Jun. 19, 2002 of Juan Ortiz, Mark Dawson, Dale McIntyre, John McBride and Mike Telek, entitled "METHOD AND SYSTEM FOR SHARING IMAGES OVER A COMMUNICATION NETWORK AMONG A PLURALITY OF USERS";

U.S. Ser. No. 10/174,882, filed Jun. 19, 2002 of Dale McIntyre, Mark Dawson, Mike Telek, Juan Ortiz, and John McBride entitled "METHOD AND SYSTEM FOR SHARING IMAGES OVER A COMMUNICATION NETWORK AMONG A PLURALITY OF USERS IN ACCORDANCE WITH A CRITERIA";

U.S. Ser. No. 10/174,887, filed Jun. 19 2002 of Mark Dawson, Dale McIntyre, Juan Ortiz, and John McBride entitled "METHOD AND SYSTEM FOR SELLING GOODS AND/OR SERVICES OVER A COMMUNICATION NETWORK BETWEEN MULTIPLE USERS".

FIELD OF THE INVENTION

The present invention is directed to a method and system for sharing images over a communication network between individuals.

BACKGROUND OF THE INVENTION

In the prior art, the sharing of digital images over a communication network, such as the Internet, is accomplished by attaching a file to an e-mail whereby the recipient must detach the image file, store it and then view it. If the recipient wishes to send the image file to another individual, they must know the electronic address and go through a process of opening a new document and attach the received image file, and optionally adding any images of their own to the attachment. This is a relatively cumbersome process. The problem of sharing multiple images with additional users and attachments becomes even more complex.

U.S. patent application Ser. No. 09/470,814, filed Dec. 22, 1999, describes a system whereby users attend a common event whereby each of the users capture individual images. The individual images are all placed at a common site for viewing and for the potential ordering of image products. However, in this system, users must either have film images scanned and uploaded to the site or digitally uploaded on their own.

There also exists peer-to-peer architectures that allow a user to view pictures that another person has designated for sharing by actively connecting to the other person's computer and searching. However, this system of seeking and finding images for viewing is tedious and time consuming. Furthermore, only one person's images may be viewed during a given connection.

Kodak's Photoquilt is another example of a prior art system wherein multiple users upload images to a web-based application and allow multiple users to view the images independently. In this system, the user must upload their own pictures which can be a complex process. Pictures are manually screened for objectionable content and then loaded to the quilt overnight. The content is not managed in a theme based manner but may be searched for a theme. Furthermore, a user wishing to view the images must constantly connect and reconnect to see any updates.

There also exists on-line photosystems such as provided by Ofoto wherein images of a user may be shared by allowing access to a third party to designated images. Hereagain, the second person viewing the images is limited to a particular user and to only the images designated.

The present invention is directed to solve many of the problems in the prior art whereby images may be shared among a plurality of users. In addition, the system according to the present invention, allows the providing of comments and editorials with regard to specific images that can be directed to a specific individual or to the group as a whole.

SUMMARY OF THE INVENTION

In accordance with one aspect of the present invention there is provided a method for setting up a system for sharing images among a plurality of users in a first image sequence, comprising the steps of:

a. providing a plurality of digital images to a controlling computer having software for controlling the sharing of the digital images among a plurality of designated users in the first image sequence;

b. providing a list of list of electronic addresses for the designated users;

c. forwarding an invitation to the designated users for gaining access to the plurality of images over a communication network by the controlling computer;

d. forwarding user software to the designated users that accept the invitation; and e. automatically forwarding the plurality of digital images in a predetermined sequence to the designated users that accepted the invitation.

In accordance with another aspect of the present invention there is provided a computer software program for sharing images over a communication network, the computer software program when loaded onto a computer will cause the computer to perform the steps of:

a. providing a plurality of digital images to a controlling computer having software for controlling the sharing of the images among a plurality of designated users in the first image sequence;

b. providing a list of electronic addresses for the designated users;

c. forwarding an invitation to the designated users for gaining access to the plurality of images over a communication network by the controlling computer;

d. forwarding user software to the designated users that accept the invitation; and e. automatically forwarding the plurality of digital images in a predetermined sequence to the designated users that accepted the invitation.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
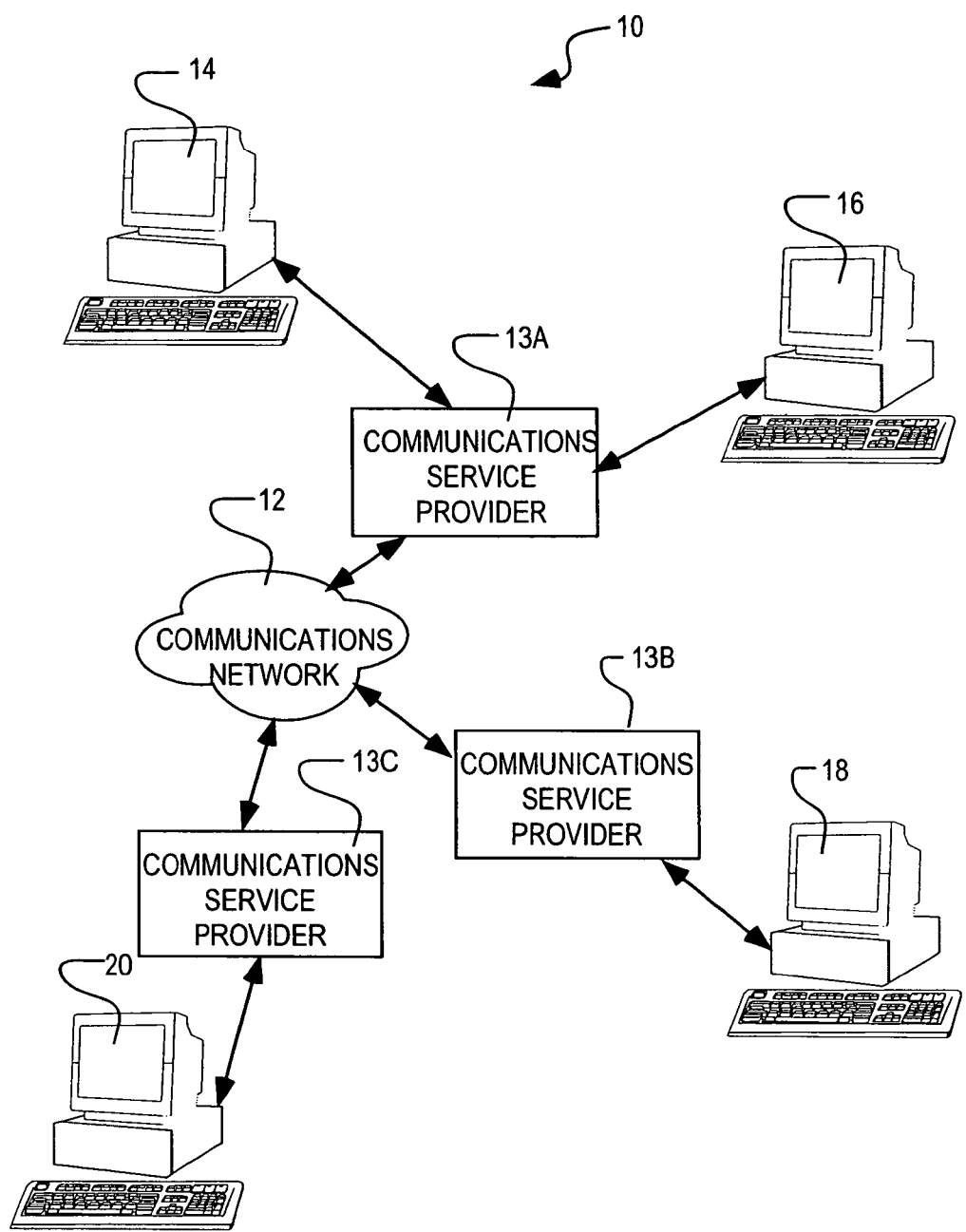
FIG. 1 is a schematic diagram of a system illustrating how the various users are connected together.

Referring to FIG. 1, there is illustrated a diagram of a system 10 for sharing digital images in accordance with the present invention. The system 10 is capable of sharing digital images or application specific computer files represented by digital images among a plurality of remote users having computers 14, 16, 18 and 20 over a communication network 12. In the particular embodiment illustrated, each of the computers 14, 16, 18 and 20 are associated with a plurality of communication service providers 13A, 13B and 13C that allow access to the communication network 12, which in the embodiment illustrated comprises the Internet. However, the communication network 12 may be any appropriate system that allows individual computers to communicate electronically with each other. It will be understood that access to communication network 12 provided by communication service providers 13A, 13B, 13C can be accomplished through one communication service provider or any number of communication service providers depending upon the individual users and their preferences. In the particular embodiment illustrated, one of the computers 14, 16, 18, 20 will be hosting the sharing of the images among the designated users over communication network 12. In the particular embodiment illustrated, computer 14 is the hosting/controlling computer and computers 16, 18, and 20 form a list of participating users that can be used in a sequential manner as will be evident from further discussion. It is to be understood the controlling computer 14 need not be directly associated with any of the designated users viewing the image as will also be discussed later herein. Appropriate sharing software for permitting the sharing of images in accordance with the invention is provided on the controlling computer 14 and each of the computers 16, 18, and 20.

Figure 2:
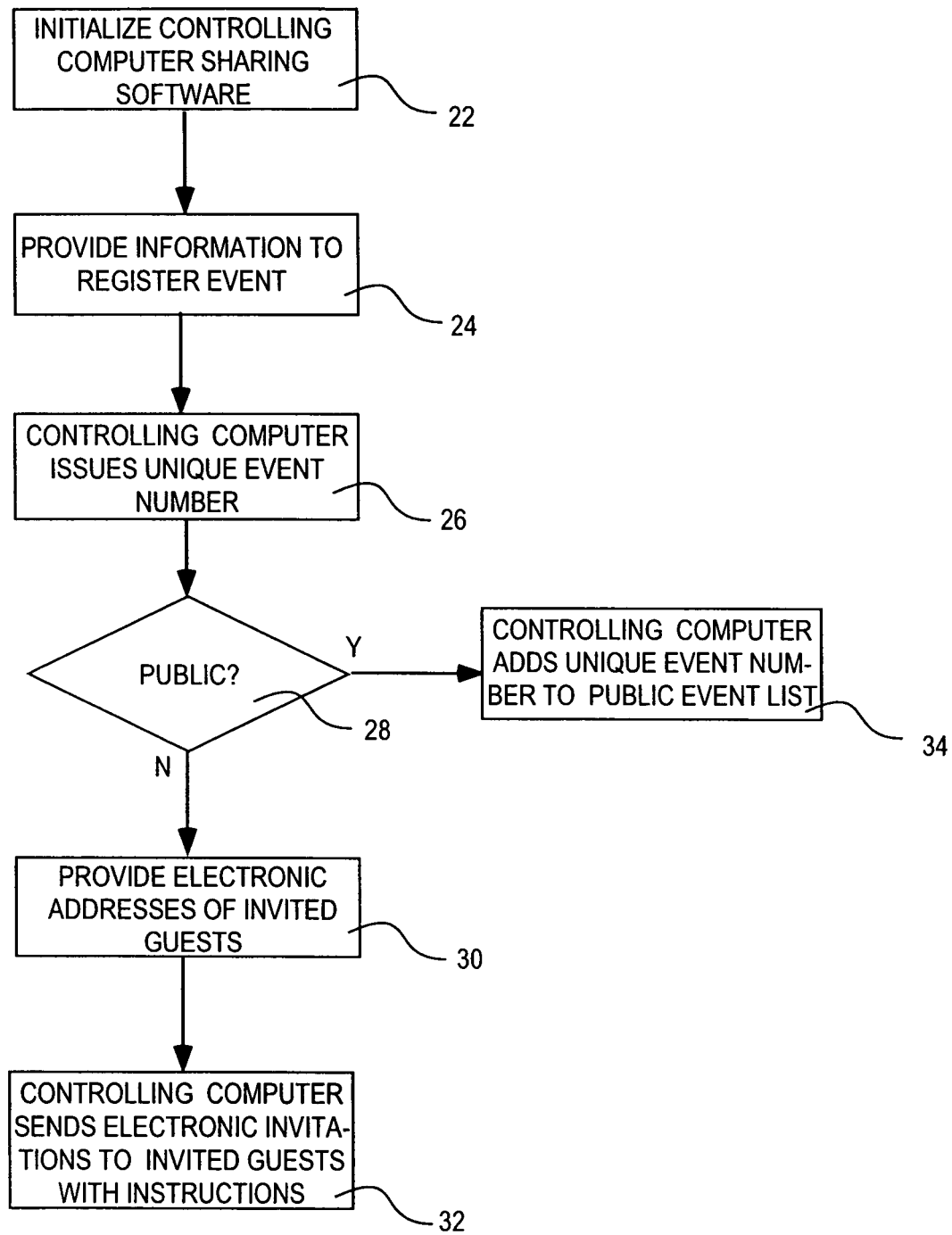
FIG. 2 illustrates a flow chart on how an image sharing event may be initiated.

Referring to FIG. 2, there is illustrated a flow chart for initiating the sharing of digital images. In order to share digital images among designated user/users, an initiating or host user must first initiate the sharing software program (step 22) of the host computer, which in this example is controlling computer 14 to register an image sharing event. The image sharing event can be, but is not limited to, a period of time during which digital images are to be shared defined by a start time and date and a time duration. Upon creation of the image sharing event, the controlling computer 14 assigns a unique event number associated with the initiating or hosting user.

The next step 24 of this initiation process involves the host user providing information or event criteria to the controlling computer 14 that further defines the image sharing event such as a theme of the digital images to be shared. A theme can be for an example, but not by way of limitation, a category of pictures such as "baby" pictures or "birthday" pictures, a common event such as Christmas, Easter, Independence Day, a specific product offered for sale, vacation, specific products being auctioned or any other way of categorizing information to be viewed in accordance with the present invention. Further information or event criteria such as the minimum number of times that the shared images cycle through the list of participating users, hereafter referred to as a round, also contribute to the definition of the image sharing event. A round does not imply that each participating user views the digital images being shared. Rather, a round presents each participant, in a predetermined sequence, the opportunity to view the images to be shared. An image sharing event can have criterion like a specified minimum number of rounds that can cause the image sharing event to exceed the maximum event duration. Likewise, the image sharing event duration may exceed the time necessary for the sharing software to collect all the images to be shared in the specified minimum number of rounds. In either of these cases, the host can provide instructions to the controlling computer 14 on how to handle these exceptions.

Other relevant information can include permission to use shared images collected by the controlling computer 14 during the sharing event. Furthermore, a host user can provide payment means such as a credit card number or an account to debit in exchange for the providing of goods and/or services with respect to any of the images to be shared that the hosting user may select during the viewing of the event. For the purpose of clarity, the group of images to be shared shall be referred as a compilation of digital images. The presentation format of the compilation of digital images can be anything desired and shall be referred to as a sequence of images or imagettes. For example, but not by way of limitation, the sequence of imagettes can move in a sequential display stream (see FIGS. 8A-8E) across the display device of the computers involved in the sharing event. In another example, images occupy a fixed area of the display device one at a time with each ensuing imagette replacing the previously displayed imagette.

At the next step 26, the controlling computer 14 issues a unique event number for the purposes of controlling and tracking the image sharing event and related activities such as the ordering of goods and/or services. At step 28, the initiating user makes a determination whether the image sharing event that he/she is creating is to be shared with anyone with installed sharing software and will be referred to as a public event. If the sharing event is not public, then it is by definition private, and the user provides a list of guest users to be invited in step 30. The guest list includes an electronic address of the guest users such as an email address or an instant message address such as the "Buddy List" implemented in the Instant Messaging software from America Online™.

In step 32, the controlling computer sends out event e-mail invitations to the designated guest users, which in the embodiment illustrated, are represented by computers 16, 18, and 20 of FIG. 1. These event e-mail invitations typically would identify the hosting user inviting the sharing of images along with instructions for participating in the event. If an invited user has never participated in this type of image sharing, the instructions include directions to acquire the sharing software, in the form of a electronic address, from which sharing software can be downloaded. The electronic address can be of the hyperlink type which permits a user to activate the link and cause the computer to go directly to the site of the encoded electronic address thereby eliminating further involvement of a user. However in the preferred embodiment, the event e-mail instructions can include an attachment containing the sharing software. In this case the user merely detaches a file that when activated installs the necessary sharing software. It should be understood that it is only necessary to install the sharing software once. Successive invitation to other sharing events only require activating the installed sharing software. However, the sharing software may be forwarded to the recipients in any desired manner. For example, they may be forwarded on a computer storage medium such as a computer disk or CD whereby the user may manually install the software Continuing on in the flow chart of FIG. 2 with the branch where the hosting user has designated the image sharing event as public in step 28, the controlling computer 14 creates the unique image sharing event number into a public event list (step 34) for viewing by anyone with the sharing software and schedules the newly created image sharing event to run in accordance with the information provided in step 24.

Figure 3:
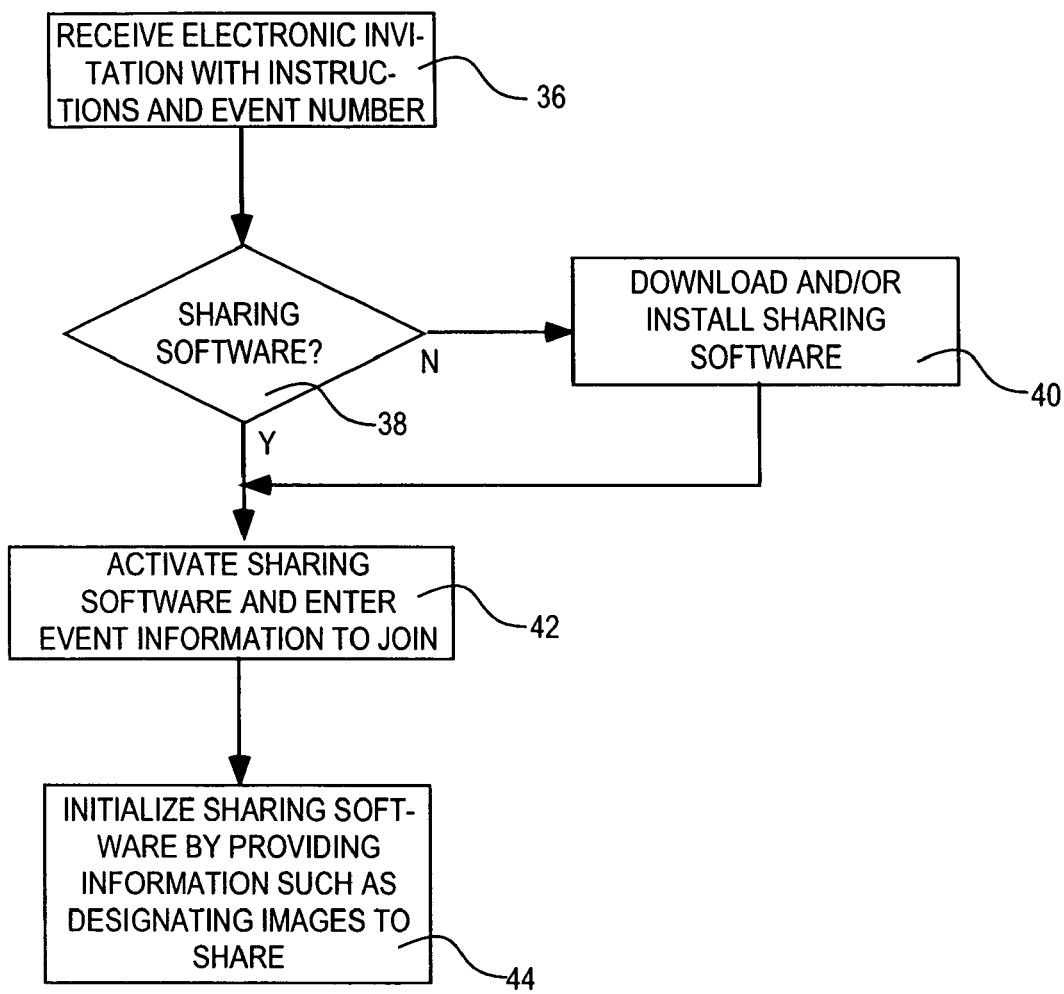
FIG. 3 is a flow chart on how an invited guest user joins an image sharing event.

Turning now to FIG. 3, there is illustrated a flow chart for describing the process of how an invited guest participates in the scheduled private image sharing event. Beginning at Step 36, the invited guest receives an electronic invitation such as an email with the participation instructions as described with respect to FIG. 2 above. The invitation includes event information such as theme, event number, and event owner (host). If the invited guest user (step 38) doesn't have the sharing software, he/she proceeds to follow the instructions of the electronic invitation to acquire the software also described with respect to FIG. 2 which is installed in step 40. In step 42, the guest user activates the sharing software which prompts the guest user to enter a name (email address) and password which may have been provided as part of the instructions. Commonly practiced, a user registers with a host who then provides a password to the specified address for enhanced security as is common in the art. It will be understood that the sharing software can use either approach without departing from the scope of the invention. Also provided in step 42, is the event specific information such as the event number. When the information has been entered, the sharing software on the guest user's computer causes the transmission of the computer's electronic address such as an Internet Protocol (IP) address from the computer 16 to the controlling computer 14. Following in step 44, the guest user provides further information to initialize the sharing software such as the designation of which images that are to be shared (See FIG. 5) and optionally payment means such as a credit card number to charge in case the guest user desires to order goods and/or services with respect to the shared image. This completes the process of joining a specific private image sharing event.

Figure 4:
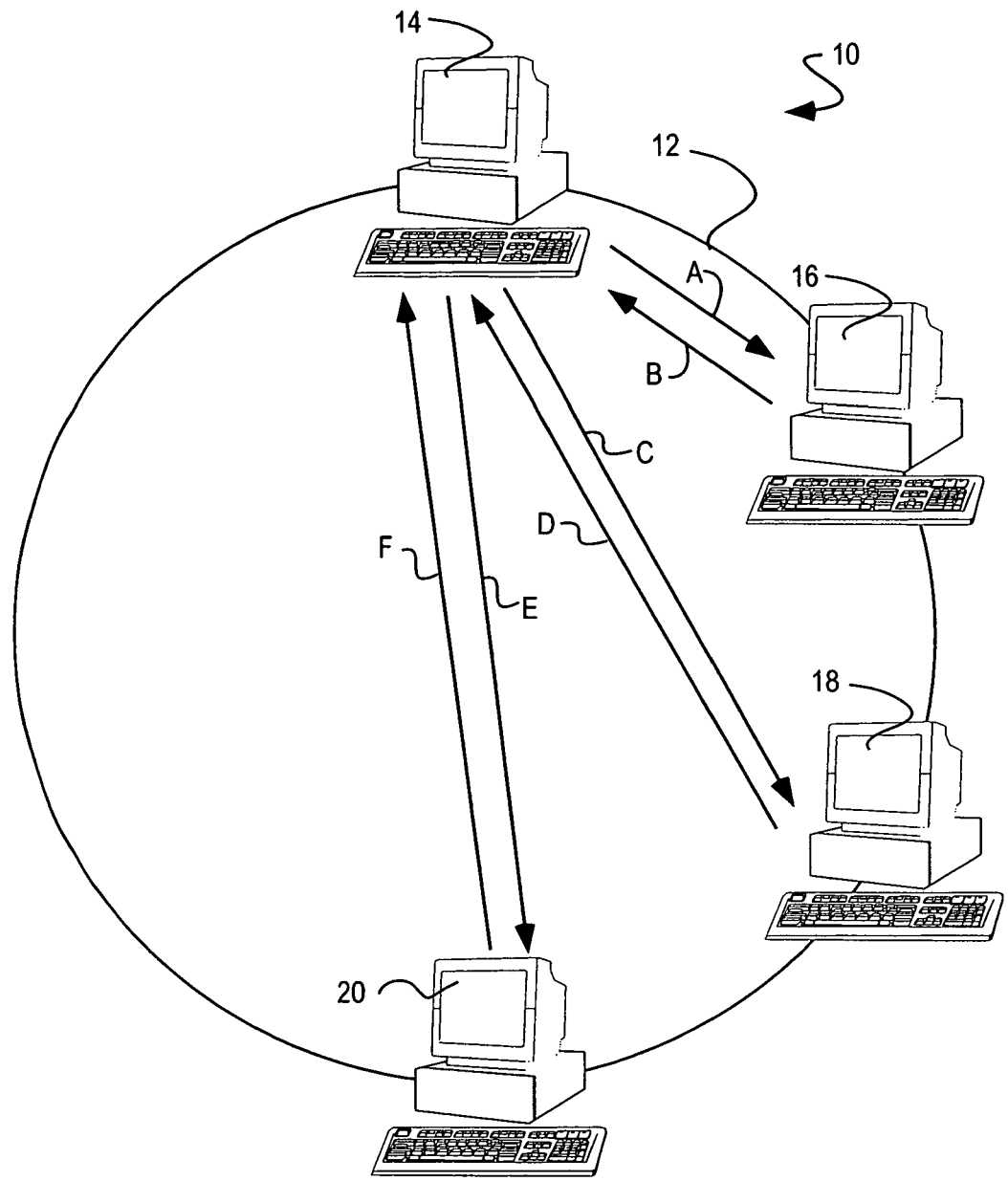
FIG. 4 is a schematic diagram illustrating the image flow of images being shared between multiple users.

Referring to FIG. 4, there is illustrated in diagram form, how images are shared with various designated users in accordance with the present invention. The controlling computer 14 controls the communication of imagette sequences and data among the designated users as illustrated by arrows A, B, C, D, E, and F. In the particular embodiment illustrated, the controlling computer 14 initiates the sharing event and can provide a plurality of imagettes in a predetermined sequence to the first designated user at computer 16 as represented by the path designated by arrow A. At the beginning of a sharing event, the controlling computer 14 can provide the first imagettes of the sequence. If the controlling computer 14 belongs to a business user, this imagette can be an advertisement, trademarked graphic image belonging to the business (See FIGS. 8A-E), or an imagette representative of the theme of the image sharing event. The controlling computer 14 can collect a fee for the display of such imagettes pursuant to the information collected from the hosting user in step 24 of FIG. 2. These fees can be assessed as a function of the number of invited guests, the number of times the imagette sequence is sent and viewed by participating users, or any other parameter of the event that the sharing software of computer 14 can measure. It should also be appreciated that the first sequence of imagettes need not be constrained to a single imagette. The hosting user may choose to pre-populate the imagette sequence with more than one imagette related to the theme such that the first user, in this case represented by computer 16, sees more than one imagette on the first round.

Continuing on, the imagette sequence is viewed by the user of computer 16. While the images are being displayed on the display device of computer 16 and viewed by the user, the sharing software also locates digital images that the user of computer 16 has designated to share and selects at least one image to become the next part of the imagette sequence. It will be appreciated that images are frequently taken in both landscape and portrait modes and rarely are the portrait (vertically oriented) images oriented properly. The sharing software uses an algorithm to automatically rotate the images that are to be shared. The properly rotated image is submitted to the imagette sequence on the user's display device and then transmitted back to controlling computer 14 along the path designated by arrow B where the submitted image is added to the compilation of digital images of shared images maintained by controlling computer 14. To conserve transmission bandwidth, the sharing software resizes the selected image to the reduced size appropriate to the imagette sequence. If a good and/or service is subsequently requested of this particular image by a user, the controlling computer 14 maintains a list of images, their owners, and their storage location (which may or may not be on computer 16) for retrieval in conjunction with the providing of the good and/or service requested. In an alternate embodiment, the sharing software transmits a copy of the full resolution shared image back to the controlling computer 14 which stores the full size shared image to facilitate the providing of goods and/or services that any participating user may request.

Sharing software can also be configured to calculate the number of images of a user to be selected and added to the compilation of digital images in each round. For example, if the hosting user defines the sharing event to have 10 rounds and the invited guest user has 20 digital images to share, then the sharing software of the invited guest selects 2 images to add to the compilation of digital images each round. In this manner, the controlling computer 14 collects all the designated images to be shared by all the participating users. In the case that an invited guest user has no images to share, the sharing software of this particular invited guest simply displays the current imagette sequence and sends a control signal to the controlling computer 14 to indicate that there are no images to add to the compilation of digital images.

Continuing on with the sharing event sequence, the imagette (or image) is received by the controlling computer 14 along the path designated by arrow B as described above and the imagette is placed in the compilation of digital images. The list of images in the compilation of digital images can be maintained and displayed as a sequential list of images. Controlling computer 14 then looks up the next participating user that has joined the image sharing event which in this case is represented by computer 18. Using the IP address provided by computer 18 when the sharing software of computer 18 joined the image sharing event, the controlling computer 14 forwards the new imagette sequence along the path designated by arrow C to computer 18 where a similar process occurs. The imagette sequence continues to grow with the addition of a shared imagette (or image) which is transmitted back to controlling computer 14 along the path designated by arrow D where it is added to the compilation of digital images.

Likewise, the imagette sequence is then forwarded to the next participating user at computer 20 by the path designated by arrow E and the new imagette (or image) is then returned to the controlling computer 14 by the path designated by arrow F and added to the compilation of digital images. It is of course understood that any desired number of users may be connected as a part of the event sharing system. In the particular embodiment illustrated, it is the hosting/controlling computer 14 that controls the sharing of the images and the sequence by which they are shared. In order to better understand how the system works a discussion of one manner in which the sharing of images may be accomplished will now be discussed in detail.

In the particular embodiment illustrated by FIG. 4, the user of controlling computer 14 may wish to share pictures of a recent vacation taken with his/her relatives that own computers 16, 18 and 20. Therefore, the user initiates the sharing software program which results in invitations being sent to each of these designated individuals to determine whether they wish to be a part of the image sharing event. If they do, appropriate software will be provided as previously discussed so that each of them may share the images as set forth. Since the controlling computer 14 is the hosting computer, computer 14 is preferably accessible over communication network 12 at all times. Computer 16, 18 and 20 will each have the ability to view images by the activation of their respective sharing software allowing them to be actively engaged in the sharing process. The controlling computer 14 forms a predetermined sharing sequence or list of participating users that is used to determine the order in which the imagette sequence proceeds between participating users. In the particular embodiment illustrated, the user of computer 16 would be the first user to see the imagette sequence. The imagettes are preferably sent to computer 16 such that they are overlaid over the current working screen of the display device of computer 16 (FIGS. 8A-8E) being used by the user. In a similar fashion, the imagette sequence proceeds from computer 18 and henceforth onto computer 20 to complete a round. If the specified minimum number of rounds has not been met, the sequence repeats along the paths described above. The sharing software of computer 14 continues to collect images from each participating user's computer by collaborating with the sharing software of the respective guest computers 16, 18, and 20.

In the event that one of the users is not on-line in order to receive the imagettes, the imagettes will be sent to the next user in the sequence that desired to view the images. For example, if computer 16 is not on-line or its user does not wish to view the images that are being offered for sharing, the second individual to view the compilation of digital images would be the user at computer 18. Thereafter, the next user would be user at computer 20.

In the event that a designated user comes on-line at a point in time when the compilation of digital images is being viewed by a subsequent designated user, the compilation of digital images is preferably viewed from the beginning and then will continue as modified by each of the users that have already seen the images in the compilation of digital images. For example, if the users at computers 18 and 20 are on-line, user at computer 18 is the first to use the sharing system, and if users at computers 18 and/or 20 decide to add additional images and/or comments, these additional images and/or comments will be placed in the compilation of digital images. Thus, when user of computer 16 selected to view the compilation of digital images, the user at computer 16 will view the sequence of the images from the beginning and will include any additions and/or comments made by previous users at computers 18 and 20.

Of course, a popular application such as sharing images can create a large number of users and subsequently a large number of images. If not properly managed by controlling computer 14, a user who is further down the list of registered users may have to wait an unacceptable amount of time to receive the compilation of digital images. To avoid this situation, the sharing software of controlling computer 14 can send a subset or subcompilation of images to each computer that is participating in the image sharing event. The number of images in this subcompilation can be adjusted by the user of the controlling computer 14 or it can be automatically adjusted as a function of the number of images in the compilation of digital images. In this manner, each user is viewing images simultaneously. However, the subcompilation of images being viewed by each user is unique to that user until the subcompilation of images being viewed is passed to the next sequential user.

Another important consideration with image sharing events having a large quantity of images is a user who drops out of the event at a point where he/she has viewed many hundreds of images. When that user decides to re-enter the event, he/she doesn't necessarily want to see the images that he/she has already viewed. The user's sharing software can keep track of the point in the compilation of digital images where the last image was viewed. This information is transferred to the controlling computer 14 upon returning to the image sharing event. When returning to the image sharing event, the user is permitted to specify the last image viewed (done automatically as described above) or specify any point in the compilation of digital images that they would like to begin at. In this case of a specified start point, controlling computer 14 must place the user at a point in the sequential list of users that is next to view a specific segment. Other aspects of image sharing events with large numbers of images will be discussed later in the specification with respect to FIG. 23.

Figure 5:
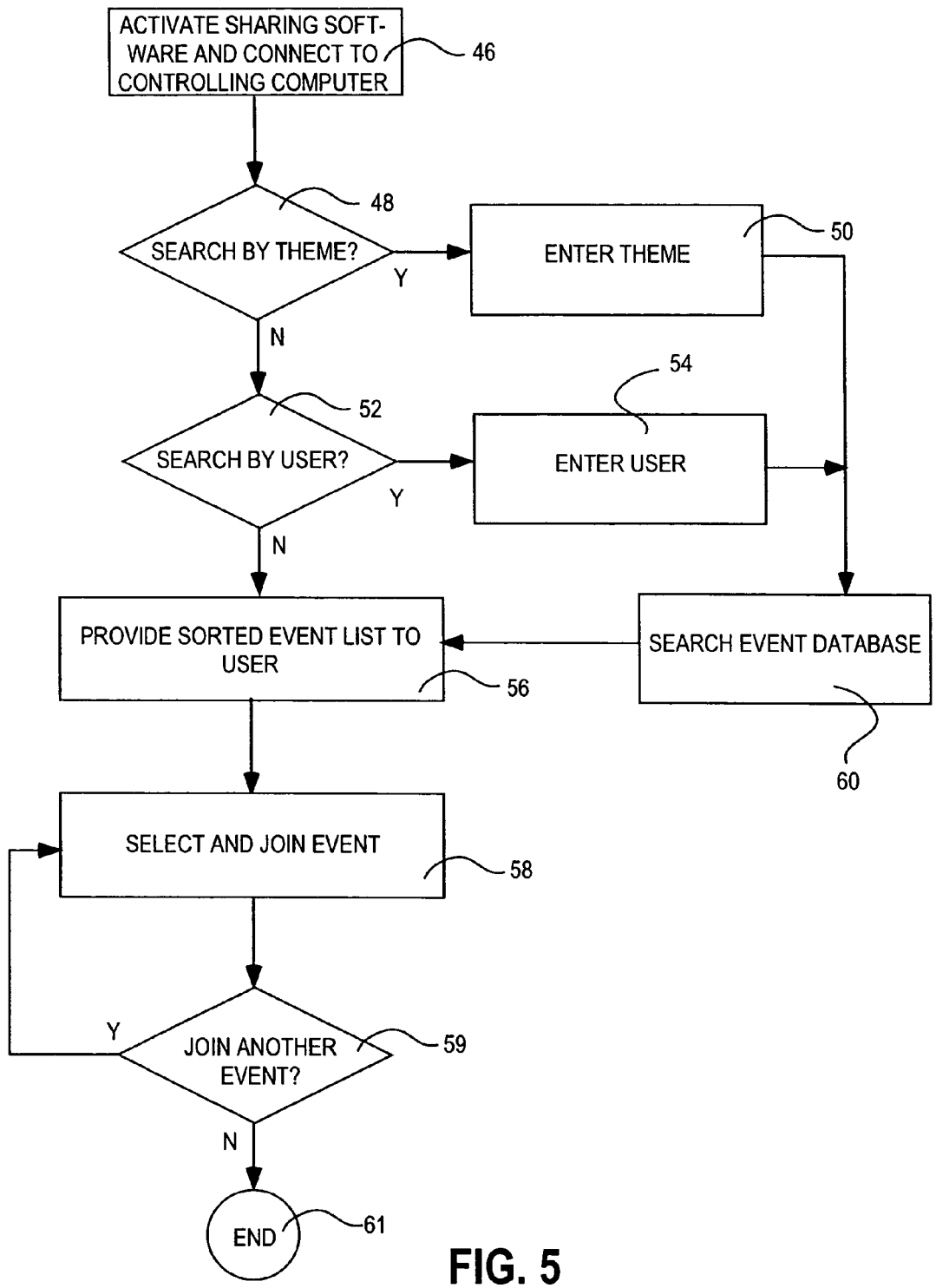
FIG. 5 is a flow chart of the operation of the process of designating images to be shared according to the present invention.

In FIG. 5, a user activates (Step 46) their sharing software wishing to determine if there are any public image sharing events that he/she is interested in participating in. Activating the sharing software (Step 46) connects the user to the controlling computer 14 which in turn, asks the user if they wish to search the event database by theme (Step 48) or by specific user (Step 52). If the user specifies the theme or user in Steps 50 and/or 54, the event database is searched (Step 60) and controlling computer 14 returns a sorted event list to the user in Step 56. If the user wishes to see all events, the decisions of Steps 48 and/or 52 are declined and the controlling computer 14 returns a complete list of events (Step 56) from the event database that are sorted using a default criteria. A default sorting criteria can be, for example but not by way of limitation, the starting time of the events or simply an alphabetical list by owner, theme, etc. The user views the returned list of events and selects the events of interest to join in step 58. The user is not limited to joining only one image sharing event. In step 59, the user can choose to join another event by returning to step 58 or simply end the process in step 61.

Figure 6:
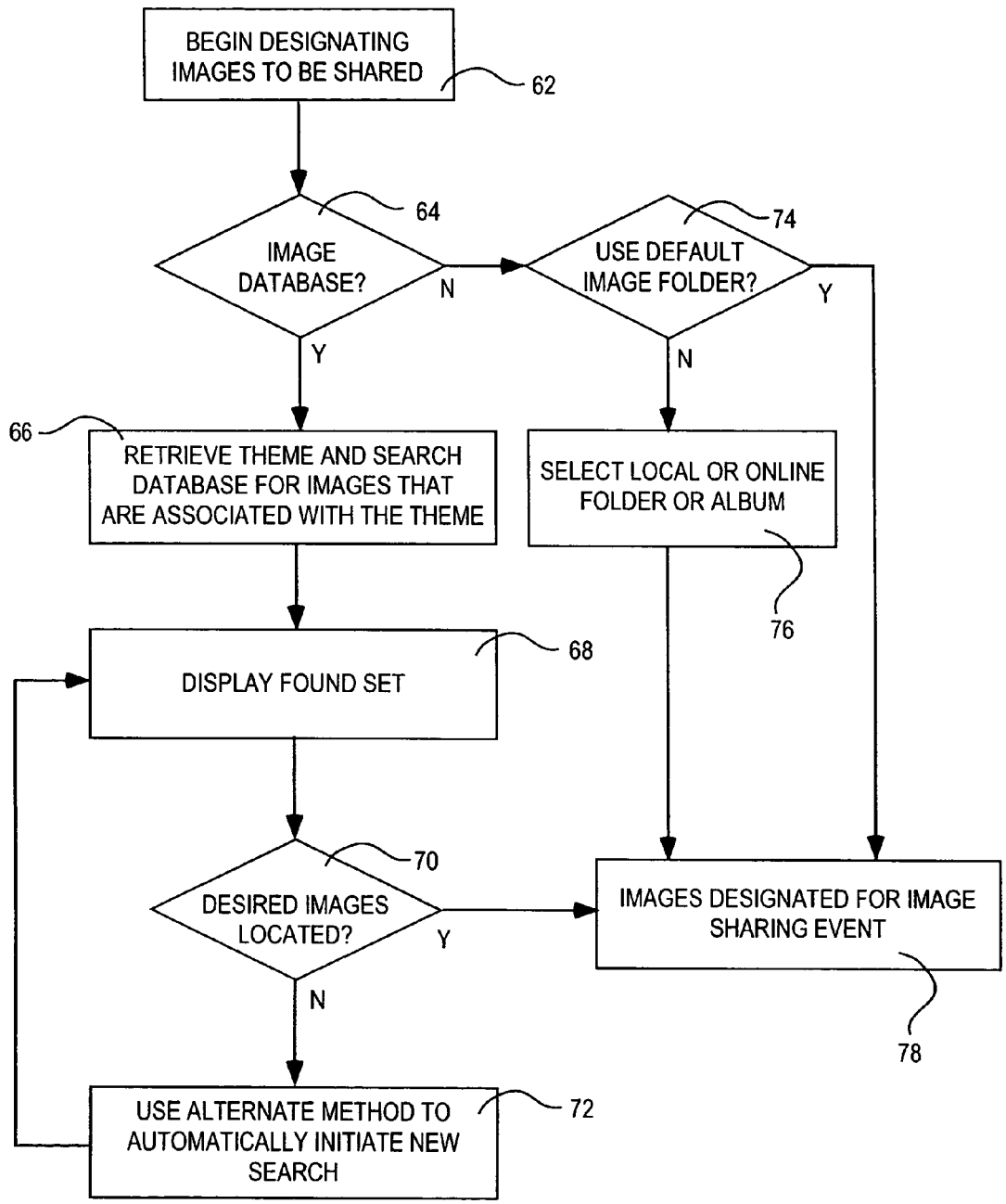
FIG. 6 is a flow chart of the operation of the process of joining a public image sharing event according to the present invention.

In FIG. 6, the process of designating the images that are to be shared begins (Step 62). The sharing software of the user's computer then searches the file system of the computer (Step 64) for the presence of a database structure for managing images. If no database structure is found, the sharing software of the user asks the user if he/she wishes to use the default folder (Step 74). If the default folder is the designated folder (Step 78), the user is reminded that he/she must locate and move the images to be shared to the default folder. If the user doesn't wish to use the default folder, he/she designates a folder (Step 76) containing the images to be shared. It should be noted that the user may designate a folder that is stored a remote location. For example at a popular online image sharing website such as Ofoto Inc., a user could designate images stored at this site which are commonly referred to as an online album. Using such a method, high resolution images are already available at a service provider such as Ofoto Inc. and facilitate the ordering of goods and/or services with respect to shared images as such businesses maintain very high bandwidth communication networks to speed image transfer.

If a database structure has been found in Step 64, then the sharing software of the user retrieves the event theme (Step 66) stored by the sharing software of the user as described with respect to FIG. 5. The theme is then applied to the database to search and retrieve images that are associated with the theme. This association is typically achieved by matching the theme to keywords often referred to as metadata that are stored in correlation with images. One such commercially available example is the database used by Image Expert 2000 from Sierra Imaging. The set of images that have been found and retrieved are then displayed (Step 68) for the user to confirm that these are the images to be shared (Step 70). Upon confirmation of the found set of images, the process of designating images is complete (Step 78). If the found set is not confirmed by the user, an alternate method (Step 72) is automatically initiated on behalf of the user to find appropriate images to share. Each found set is displayed again in Step 68 and the cycle of searching and confirming repeats until the desired set of images has been designated (Step 78). One such alternate method involves commonly used natural language processing techniques such as looking for synonyms of the theme and searching on those terms. Another alternate method of searching the database is to use the theme to search image filenames. A still further method involves providing the user with a list of searchable terms to select from or merely providing a text entry box for the user to manually enter search terms.

Figure 7:
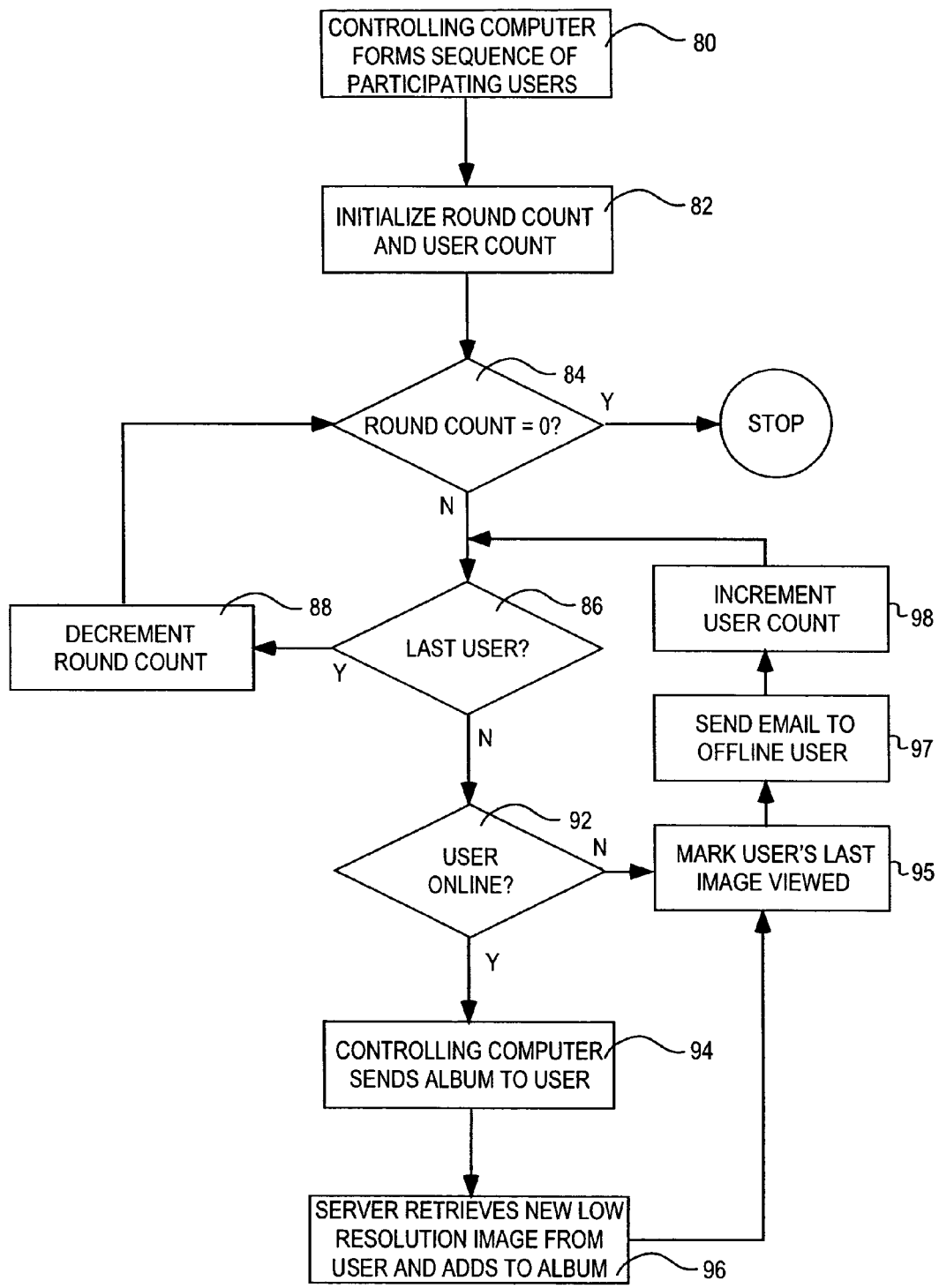
FIG. 7 is a flow chart of the operation of the sharing process according to the present invention.

In FIG. 7, a process used by the sharing software of the controlling computer in managing an image sharing event is described. Beginning with Step 80, the controlling computer 14 forms a sequential list of users that have chosen to participate in a particular image sharing event. The sequence of users can be formed from the order in which each user joined or it can be formed from any other criteria such as, for example but not by way of limitation, the frequency in which a user participates in image sharing events or an alphabetical listing or a specific geographic progression determined by the network origination of the user's network connection. There are unlimited ways in which this sequence of users can be formed. After initializing the round count in step 82, controlling computer 14 then begins to execute a software loop that checks the round count (Step 84), checks to see if the next user is the last user in the sequence (Step 86), check to see if the user is still online (Step 92), sends the compilation of digital images to the user (Step 94) and retrieves a new image, preferably low resolution, from each participating user (Step 96) and adds the image to the compilation of digital images to be shared. Steps 88 and 98 are counting steps that serve to insure that each sequential user is counted before the round count is changed. If in step 92 the controlling computer 14 finds that the user is no longer on line, controlling computer 14 marks (step 95) the point in the image sequence where the last image was viewed and automatically sends the user an email (step 97) message containing an electronic link to that point in the image sequence. At a future time, the user upon receiving the email message can re-enter the image sequence at the appropriate point. Incrementing the user count in step 98, controlling computer 14 returns to the next user in the sequence in step 86 as previously described.

Figure 8A:
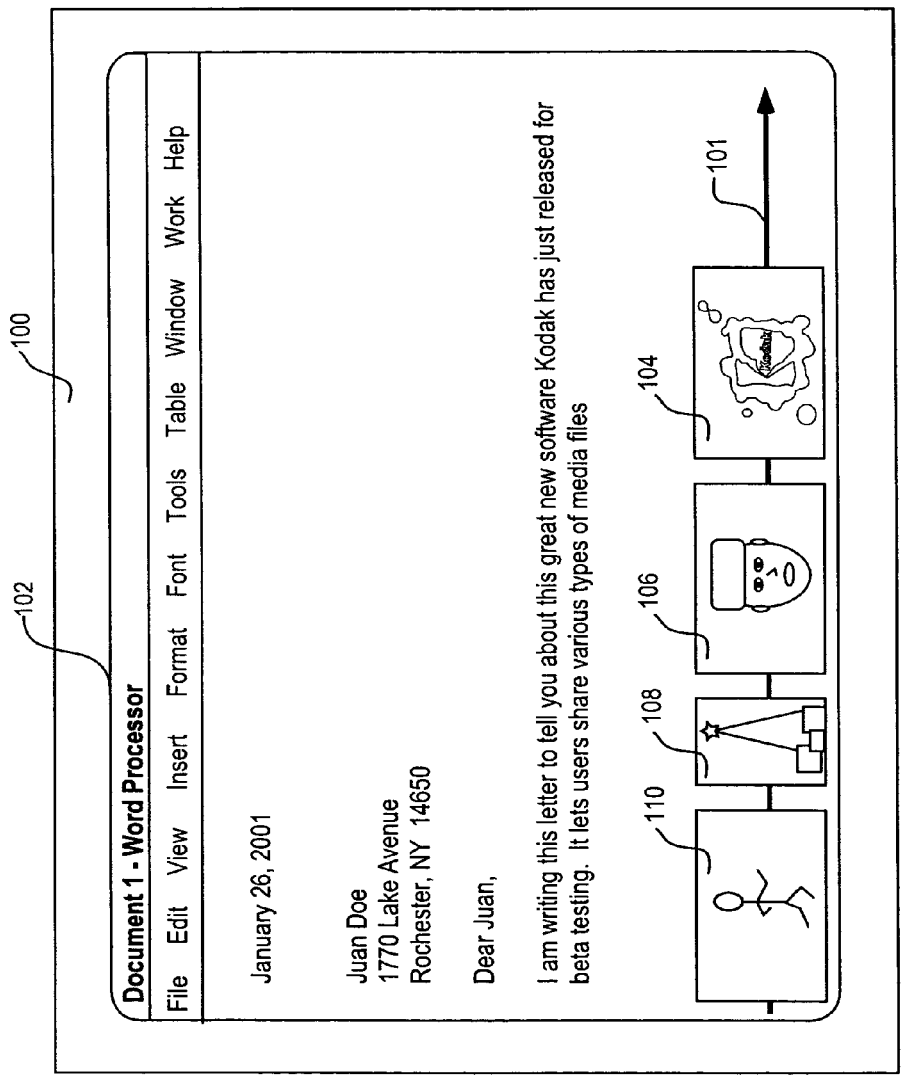
FIGS. 8A-E are screen shots illustrating how images may be shared in accordance with one aspect of the present invention.
Figure 8B:
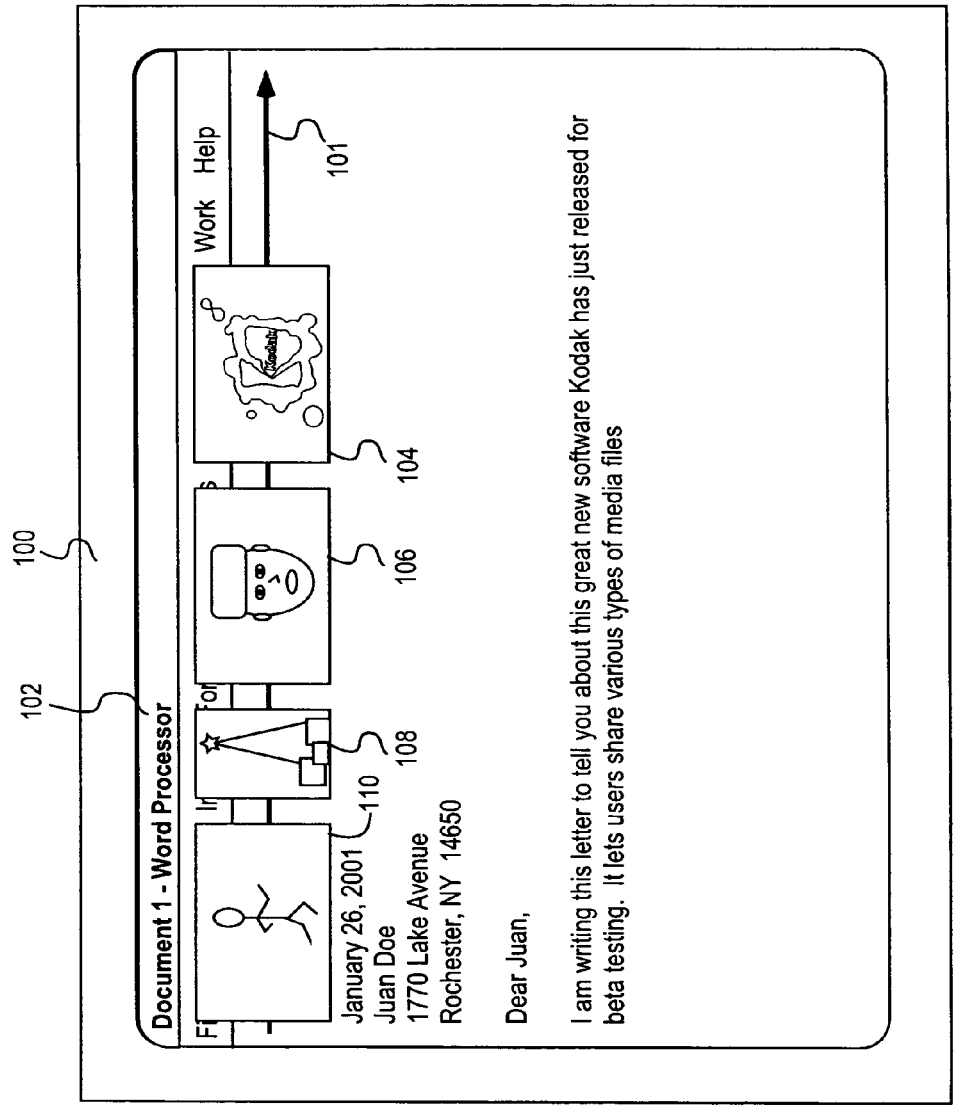

Referring to FIG. 8A, there is illustrated a display device 100 such as would be used by the first user to view images at computer 16 or used by any of the other users at computers 14, 18, 20 to view the images being shared. The forwarded images are displayed in a designated pattern. In particular, as illustrated, a plurality of imagettes (small images) is provided. The first imagette 104 is just simply an icon representing the business sponsoring the image sharing event that is running. This icon may provide additional information such as the name of the images, the hosting computer, or some other desired information such as a promotion, brand message, or other predetermined image the presence of which may be paid for by the owner of said information. Imagettes 106, 108, and 110 are images in the compilation of digital images that is being shared between the controlling computer 14 and computer 16. The imagettes 104, 106, 108, and 110 are preferably designed to move along the display screen from left to right, for example but not by way of limitation, for a predetermined period of time at a predetermined rate. As illustrated in FIG. 8A, these imagettes 104, 106, 108, and 110 move along a presentation path designated by arrow 101 on the display device 100. The path designated by arrow 101 on which the imagettes 104, 106, 108, and 110 travel may be any pattern desired. For example, path designated by arrow 101 may be solely along the bottom portion of the display device 100 or as illustrated in FIG. 8B, it may be along the top of display device 100. Similarly in FIG. 8C, the path designated by arrow 101 is a pattern that follows the outer periphery of the display device 100. As illustrated, the sharing software of computer 16 displays the imagettes along the path designated by arrow 101 in a manner that permits the user to continue to work on a document in the primary application window 102 commonly referred to as "work on top". In the example illustrated in FIG. 8A, the primary application window 102 is a word processing application and the user continues to work on the document while the imagettes 104, 106, 108, and 110 are displayed along the path designated by arrow 101. An advantage of this type of presentation is that the user at computer 16 can still work on other applications, allowing the user to simply view the imagettes as they pass by in a non-obtrusive manner.

Figure 8C:
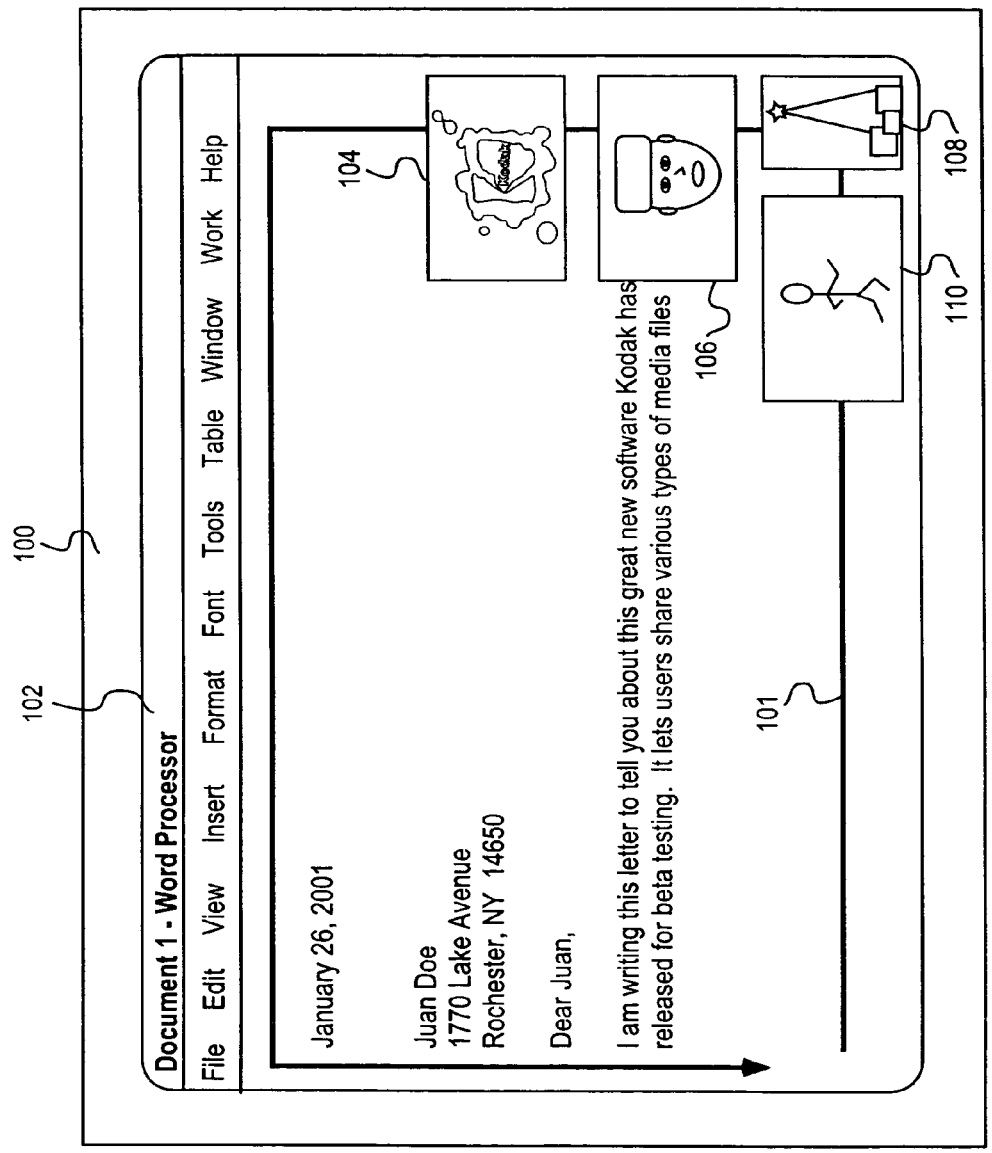
Figure 8D:
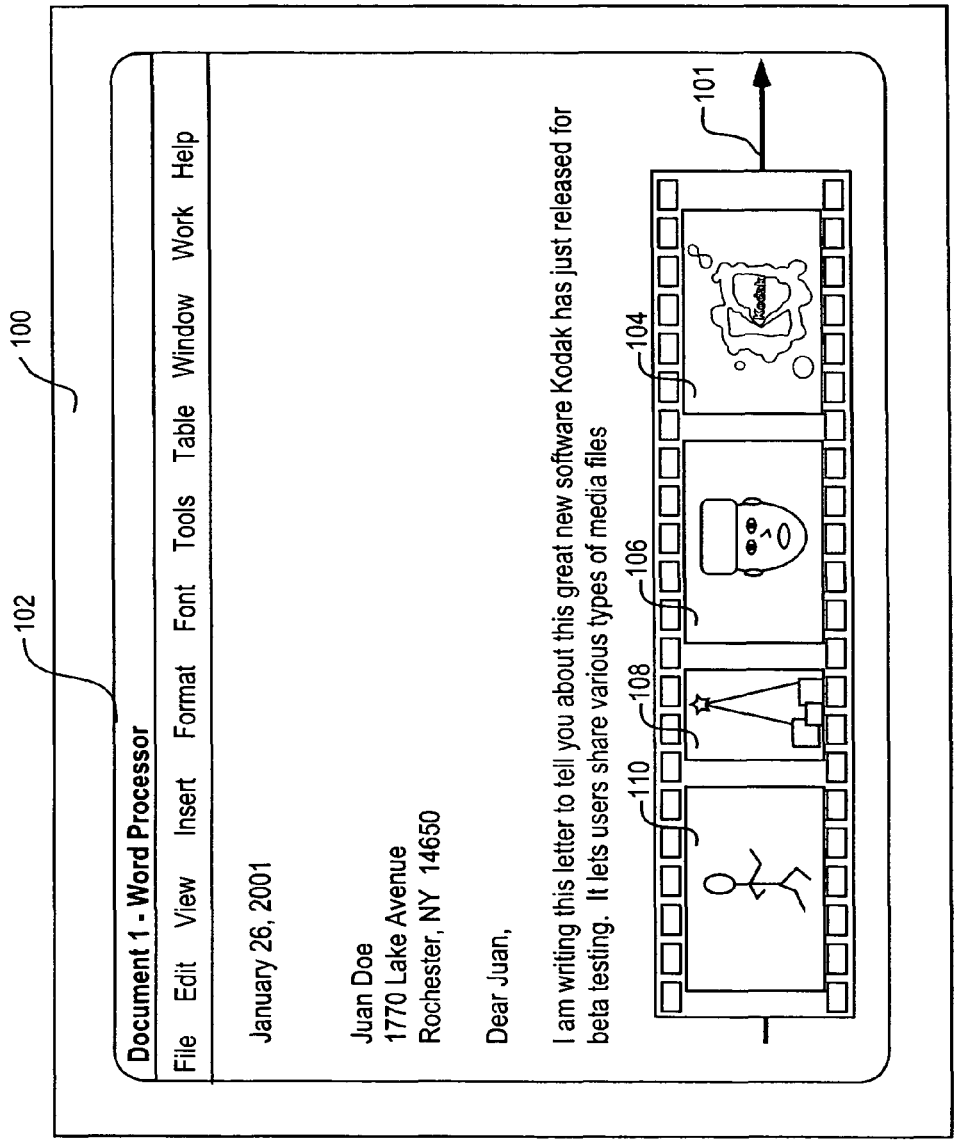

FIGS. 8B and 8C illustrate various other paths designated by arrow 101 that the imagettes may take as they are presented on the display device 100. It is of course understood that the particular path, size of the imagettes, and presentation may be varied as desired. FIG. 8D shows a similar path as illustrated in FIG. 8A, however, a different style presentation format is depicted. In FIG. 8D, for example but not by way of limitation, a filmstrip style presentation is shown. In fact, the sharing software permits the user to select a presentation style from a plurality of presentation styles that are installed as part of the installation of the sharing software or that are installed at a later date to compliment the default installation selections.

Because a user may be annoyed by a presentation path such as the path designated by arrow 101 shown in FIG. 8A for a given primary application 102, the sharing software permits the user to manually move the path. To move the presentation path, the user simply uses a commonly understood "click-drag" sequence with a mouse (not shown) to move the cursor on the display device 100 over the image sequence and drag the presentation path to a portion of display device 100 that is less obtrusive.

In the particular embodiment illustrated, a relatively few number of images are shown for the purpose of illustration. However, it is to be understood that any desired number of imagettes may be presented on display device 100 including anywhere from just a few as illustrated to a maximum predetermined number. It is anticipated that the number of images to be shared in a compilation of digital images can comprise more than the maximum number of imagettes that are allowed to be displayed on display device 100. In such a situation, the imagettes will move (scroll) along the display device 100 in the pre-selected pattern. The particular rate at which the imagettes travel along the screen can be varied as desired. The sequence of imagettes may be shown for a relatively short period of time, for example, for few seconds to a relatively long period of time such as twenty or thirty minutes. Preferably, in the particular embodiment illustrated, the imagettes move along the screen at a rate such that each of the imagettes are on the screen for about 30 seconds.

Figure 8E:
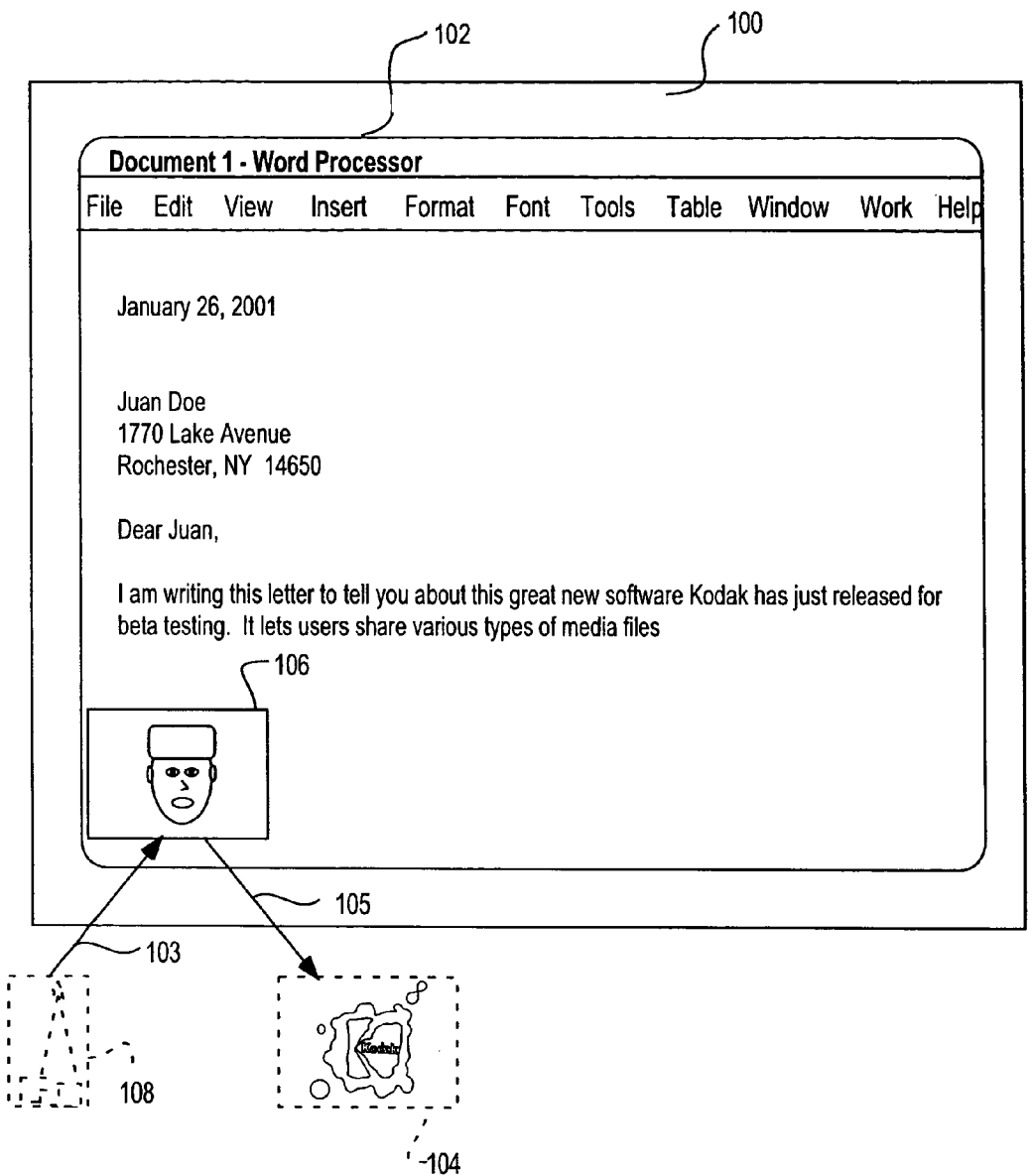

Turning now to FIG. 8E, an alternate embodiment of the presentation format is shown. In this example, a specific viewing position is shown wherein imagettes are shown one at a time in their proper sequence. Arrows 103, 105 depict the imagettes moving onto the display device 100 to the viewing position occupied in the example by imagette 106 and then off the display device. Once again, the sharing software permits the user to move the viewing position in a manual fashion as described above.

Figure 9:
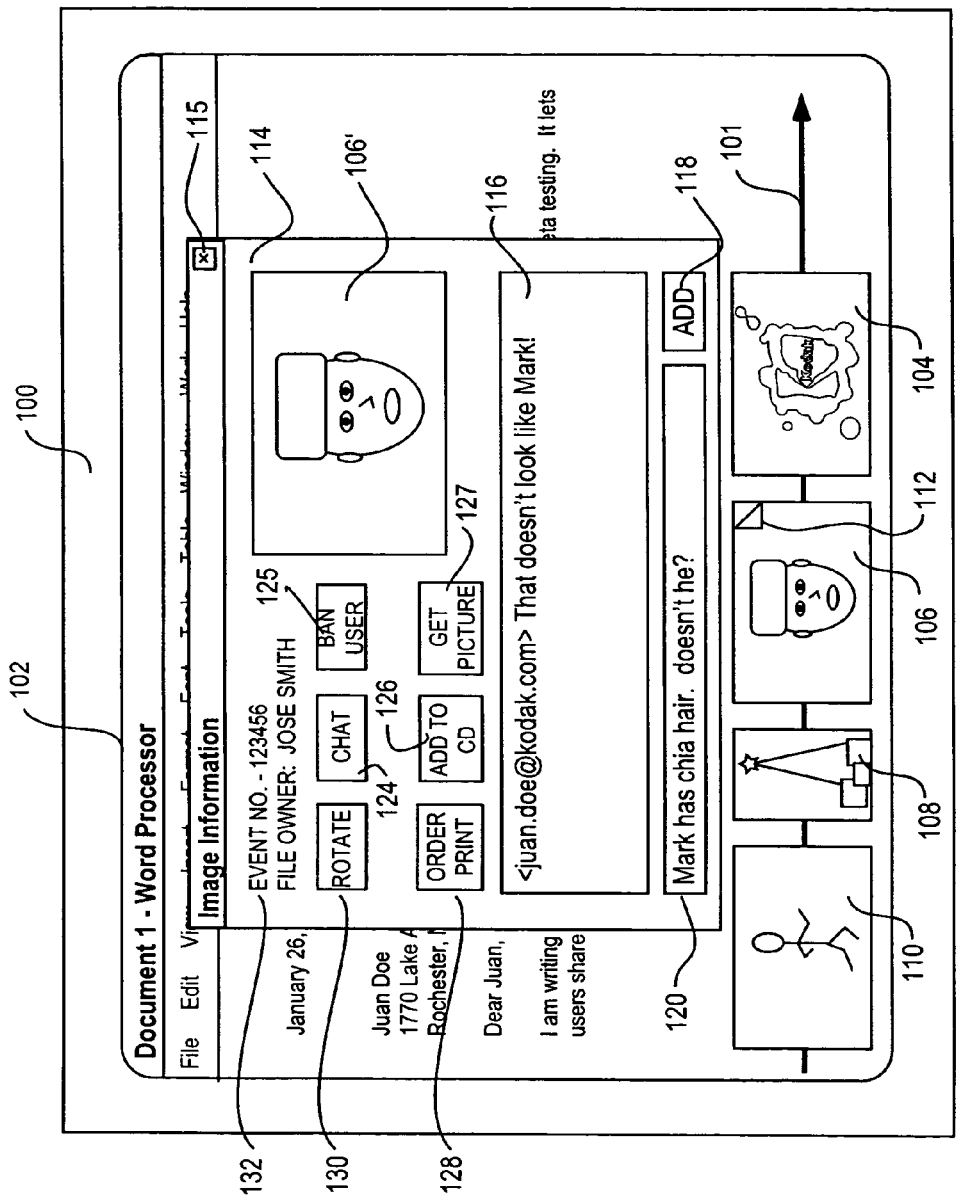
FIG. 9 is a screen shot illustrating comments that either have been provided or can be provided with respect to an image that is being shared.
Figure 14:
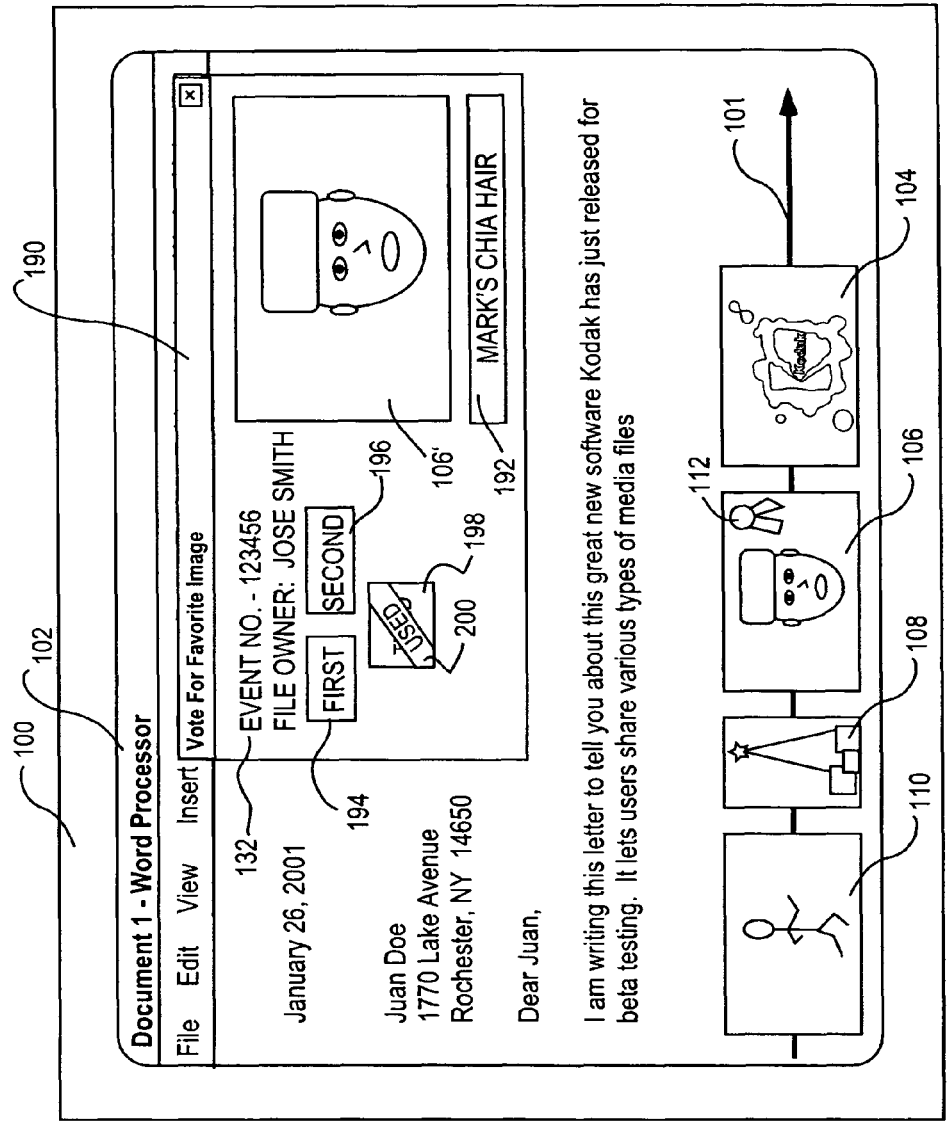
FIG. 14 illustrates a display screen of a display device used in the system according to the present invention.

Referring to FIG. 9, if a user sees an image that is of interest, the user may select that image, for example, by double-clicking on the desired image (imagette 106) which will result in obtaining a larger version of the image (imagette 106') and/or obtaining information relating to the selected image. If a larger image is to be displayed, the viewing computer may need to access the controlling computer 14 to obtain sufficient data to present the larger, perhaps higher resolution, image. Alternatively, or in addition to the larger image, an information box 114 (display) may be presented in which information may be provided with respect to the image. For example, in the particular embodiment illustrated, the information display 114 provides comments in comment box 116 originating from the owner of the image. In the particular embodiment illustrated, comments may also be provided by the user in the comment entry box 120 that can be read by the owner and/or subsequent users of the imagettes. After entering comments in the comment entry box 120, the user actuates the "ADD" button 118 which causes the sharing software to add the entered text into comment box 116 and to add an indicator 112 to the display imagette 106 in the sequence of images. Indicator 112 is a visual indication of at least one criterion assigned to that specific image by the sharing software which, in the example of FIG. 9 is the availability of comments such as found in comment box 116. Other examples of criteria assigned to images can include 1) item pictured is for sale, 2) image is for sale, 3) image or image content is the most popular and any other information that can be associated with the image. Indicator 112 can take many different shapes such as common icons to convey different information. For example but not by way of limitation, imagette 106 is shown as a "dog-ear". In FIG. 14, indicator 112 is shown as a award ribbon. Furthermore, indicator 112 can be presented with different characteristics such as for example, but not by way of limitation, the color of the icon where one color may indicate that the owner of the indicated image is available online for chat. Image specific information 132 is also shown which can provide information such as the unique image sharing event number, the identity of the image owner, or any other information that is associated with the image and desired by the user.

Also included in the information display 114 are buttons 124, 125 126, 127, 128 and 130 for causing the sharing software to initiate other functionality. Button 130, for example, permits the user to rotate an image to its proper orientation if the sharing software hasn't properly rotated the image automatically as described earlier. Button 126, when actuated, notifies the controlling computer 14 that the selected image is to be added to a CD that is to be produced for the selecting user at the end of the image sharing event. The CD comprises a compilation of images that the selecting user has selected throughout the duration of the image sharing event. The user can select such a service as described earlier with respect to FIG. 4. In a similar fashion, button 128 allows a user to order a print of the selected image. Controlling computer 14 creates a list of print requests for each user throughout the duration of the image sharing event aggregating the images selected for printing by each individual user. Button 127 causes the selected image to be transferred from the image owner's computer to the computer of the requesting user. This functionality is dependent upon permission that may be granted by participants during the registration process. If a user is sharing inappropriate or offensive images, another user can actuate button 125 to either ban the offending user or send a request to the controlling computer to ban the offending user. Obviously the owner/initiator of the image sharing event has the privilege to ban other users, but participants in the image sharing event can only request that an offending user is banned. In a further embodiment, an initiator can designate another user to watch for offensive material and ban the user who contributed that material.

In this particular embodiment, controlling computer 14 must retrieve high resolution images from the various participant's computers when the imagettes associated with those images have been selected for printing or other goods and/or services. In an alternate embodiment, the sharing software of each user keeps track of the individual images selected by the user and retrieves the high resolution images from the computer on which they originated. This retrieval is facilitated by the controlling computer 14 supplying the electronic address of the participant's computer where the image of interest is stored. Retrieval of the high resolution image can optionally include a permission step required of the image owner. In yet another embodiment, the sharing software of each user returns the high resolution image to be shared to the controlling computer 14 and which is stored by the controlling computer 14 in anticipation of possible use for the fulfillment of various goods and/or services.

Also in the particular embodiment illustrated, the imagettes stop their movement when the user selects one of the images. In order to avoid the images from being delayed too long in going to the next user, there is also provided a time period in which to add the comment by the current user. In an alternate embodiment, the imagettes would continue moving along the presentation path. In the embodiment illustrated, the movement of the imagettes are stopped, thus a limited period is provided for the addition of comments by the user which in the present case is less than 5 minutes. However, it is to be understood that the limited time period may be any desired time period. When the user is done with the information display 114, a selection button 115 is activated and the window containing the information display 114 is closed.

Figure 10:
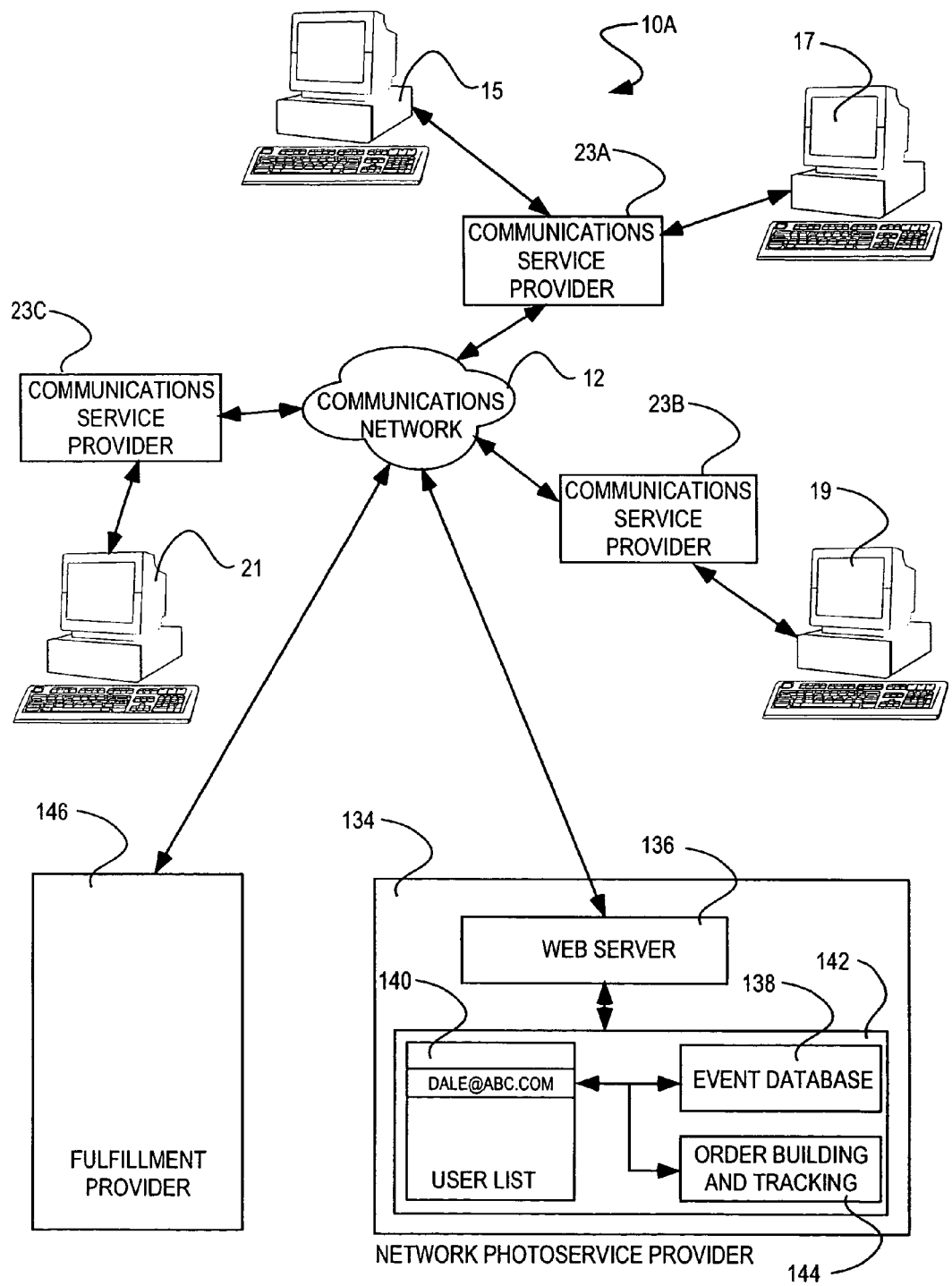
FIG. 10 is a schematic view of an alternate embodiment of the present invention illustrating a system whereby images can be shared and goods associated with images may be provided.

Referring to FIG. 10, there is illustrated a modified system 10A made in accordance with the present invention. In this particular embodiment in addition to user computers 15, 17, 19, 21, there is provided a network photoservice provider 134 which is hosting the image sharing event. An example of such a network photoservice provider 134 is Ofoto Inc. Computers 15, 17, 19, and 21 are connected to the communications network 12 via communication service providers 23A, 23B, and 23C. The network photoservice provider 134 is provided for managing the presentation of many sequences of imagettes for many different users concurrently. Thus, any particular user can connect electronically to this network photoservice provider 134 and set up a private image sharing event specifically for that individual and their invited guests. The advantage of this particular system is that the initiating user does not have to maintain the hosting system on their computer thus freeing up their computer for other tasks. In addition, the photoservice provider 134 can offer this service for a multitude of different individuals concurrently, each having their own separate image sharing events and thus allows for economy of use and provides services that an individual may not be capable or able to provide. The network photoservice provider 134 can also concurrently host a plurality of public image sharing events that can be provided in association with a sponsoring business if so desired as described earlier. The network photoservice provider 134 may, for example, be able to provide high speed communication capabilities that the initiating individual may not have. The network photoservice provider 134 can also provide goods and/or services to the users at a professional level. For example, network photoservice provider 134 can provide shipping, and billing services for goods and/or services ordered. Furthermore, network photoservice provider 134 can have additional business relationships with at least one fulfillment provider 146 that facilitates the providing of goods and/or services based on the images shared during the image sharing event. Fulfillment provider 146 is shown as a separate business entity, but the invention is not so limited. Network photoservice provider 134 can additionally fulfill the role of the fulfillment provider 146. Furthermore, information can be supplied from the network photoservice provider 134 to the users regarding discounts on image products of the displayed images or advice where additional images, goods and/or services may be obtained with respect to a particular theme that may be associated with the shared images.

Continuing with FIG. 10, network photoservice provider 134 includes a web server 136 for communicating with the users via communication network 12 and a computer 142 for managing the image sharing events registered by multitudes of users. Computer 142 includes an event database 138 which correlates specific events to registered users maintained in the user list 140. Event database 138 also includes information with regard to public image sharing events. To facilitate the ordering of goods and/or services with respect to the shared images, computer 142 also includes an order building and tracking block 144 which tracks the specific events, and for each event, it tracks the participants, the location of the images being shared, the order information for each participant as well as the content of each participant's order. In this manner, network photoservice provider 134 fills the role of the controlling computer 14 of FIG. 1. All other aspects of the operation of system 10A are similar to the previously described system 10.

In another embodiment, network photoservice provider 134 contracts with a user of computer 19, for example, to insure that certain moral and ethical standards or themes are adhered to on behalf of network photoservice provider 134. The user of computer 19 can participate in the image sharing event and observe the types of images contributed by various participating users. If an image is not properly related to the theme of the image sharing event, the user of computer 19 with event administrative privileges makes that judgment and can remove the imagette in question. If the user whose picture has been removed continues to add similar pictures, the administrative user of computer 19 can remove the offending user from the list of participating users and prevent the offending user from rejoining the event.

In an alternate embodiment of system 10A, the network photoservice provider 134 in cooperation with the sharing software of each participating computer can sequentially collect digital images from each participating computer to form the compilation of digital images without forwarding the sequence of images to each participant. After the compilation of digital images has been formed, it can be presented as part of a web site whereby the presentation can be simultaneously viewed by hundreds and even thousands of viewers. In this embodiment, there is no forwarding action of the network photoservice provider of the image sequence. All modifications to the compilation of images are done via a web site that is hosting the presentation of the image sequence.

Figure 11:
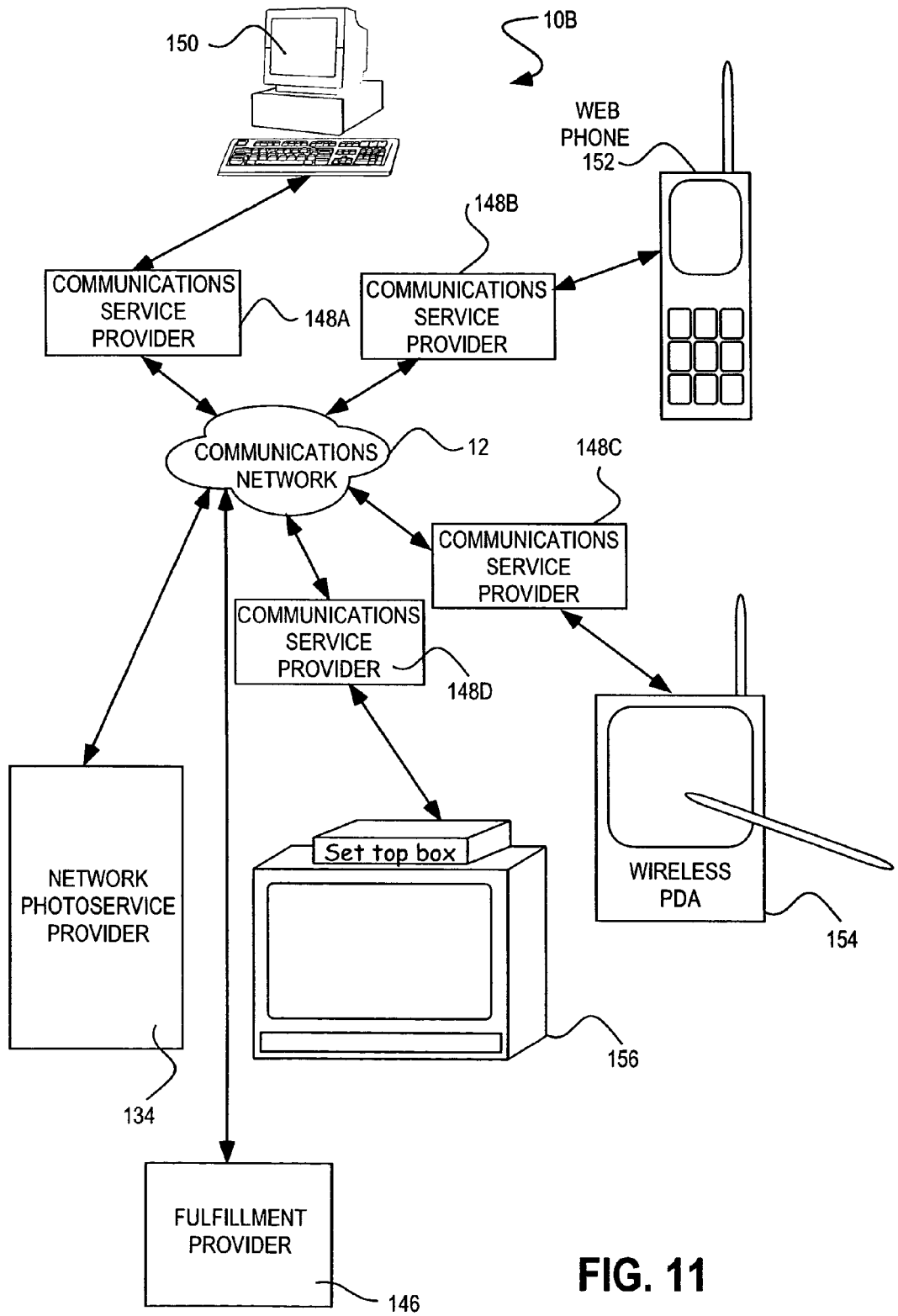
FIG. 11 is a schematic diagram of another system made in accordance with the present invention illustrating how the various users are connected together.

Turning now to FIG. 11, there is illustrated a modified system 10B for sharing digital images across a plurality of communication networks and devices made in accordance with the present invention. In this particular embodiment, network photoservice provider 134 manages an image sharing event between a plurality of users with different electronic devices, each device capable of displaying a digital image file. In system 10B, a first user with computer 150 is connected to a communication network 12 such as the Internet via a communication service provider 148A in a conventional manner. A second user with an Internet capable (web) phone 152 is connected to the communications network 12 via communication service provider 148B. In this case, the communication service provider 148B is a digital telecommunications provider with digital Internet access provided to phone users such as Sprint PCS and their Wireless Web™. The third user in FIG. 11 with a wireless Personal Digital Assistant (PDA) 154 is connected to the communications network 12 via communication service provider 148C such as the Ricochet Wireless Service from Aerie Networks Inc. The fourth user in the system 10B is connected to the communication network 12 by communication service provider 148D which in this case is the cable television network provider. Digital cable network equipment manufacturers such as Scientific Atlanta Inc. in cooperation with independent cable company owners currently permit television users access to a communications network such as the Internet. In such a manner, images from the sharing event are viewed on the television system 156 which includes a digital cable set top box such as manufactured by Scientific Atlanta Inc. and a standard television set for receiving signals from the digital cable set top box. All other aspects of the operation of system 10A are similar to the operation of the previously described system 10 with the exception that the sharing software must be modified appropriately to properly operate on each of the individual electronic devices. (Reference other patent application where we show digital cameras connecting to set top boxes and storing images on the internet)

Figure 12:
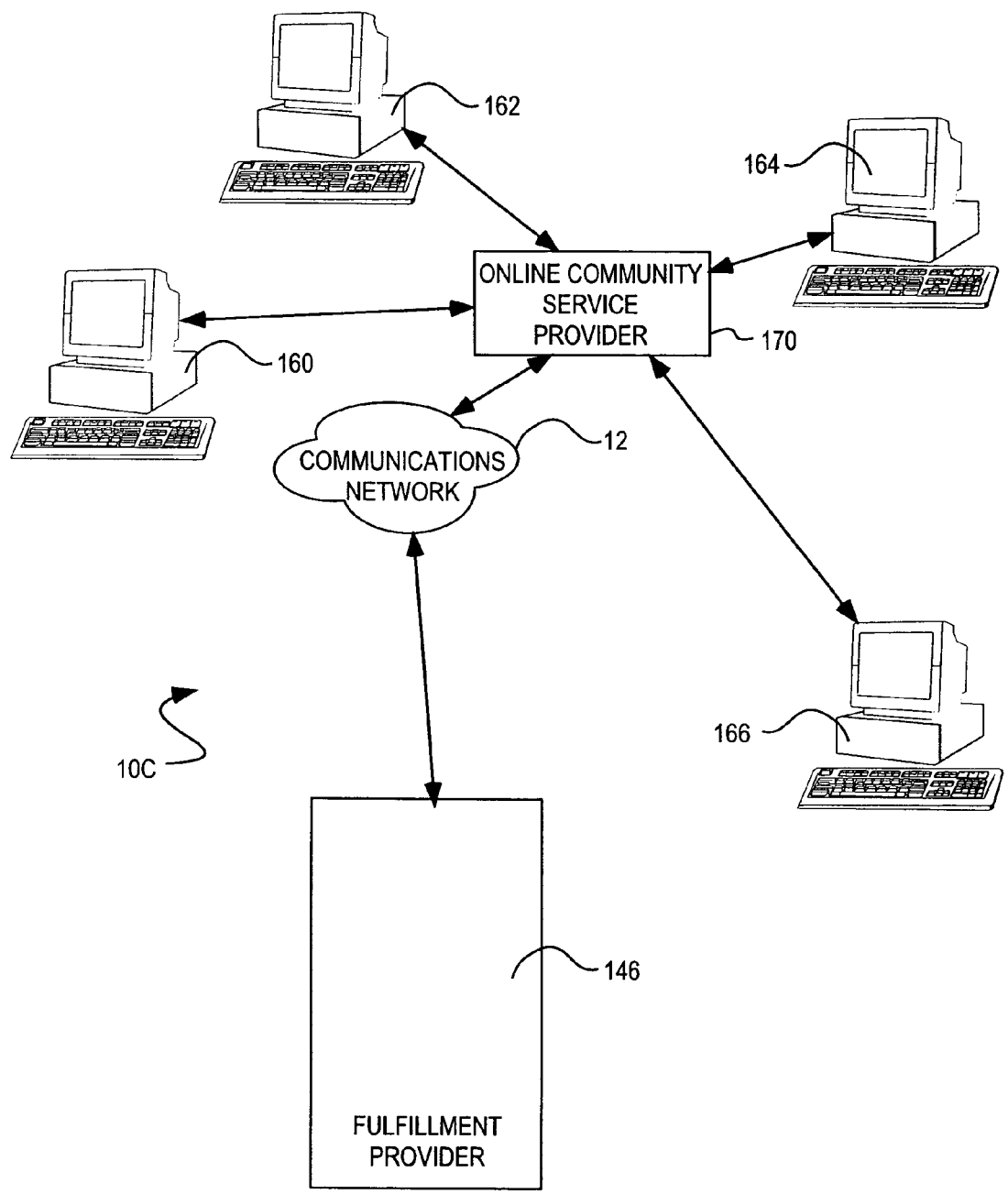
FIG. 12 is a schematic diagram of another system made in accordance with the present invention illustrating how the various users are connected together.

Referring to FIG. 12, there is illustrated yet another modified system 10C made in accordance with the present invention. In this particular embodiment, user computers 160, 162, 164, 166, are all connected to an online community service provider 170 such as America Online™ (AOL). It will be understood that members of such communities use local communication networks to effectively connect computers 160, 162, 164, and 166 to the online community service provider 170. Online community service provider 170 can also provide connection to the broader communication network 12 such as the Internet for providing other content to the community members and for passing fulfillment orders for goods and/or services to third party fulfillment providers 146.

The unique aspects of system 10C include the fact the community members already provide their electronic addresses to the online community service provider 170 in the process of connecting to the community with a login name and password. This process supports the widely popular instant messaging form of communication such as AOL Instant Messenger. Being part of this community eliminates several of the steps required by the other systems 10, 10A, and 10B since the user's electronic address is already established. The user's sharing software is then appropriately modified to eliminate those unnecessary steps.

Figure 13A:
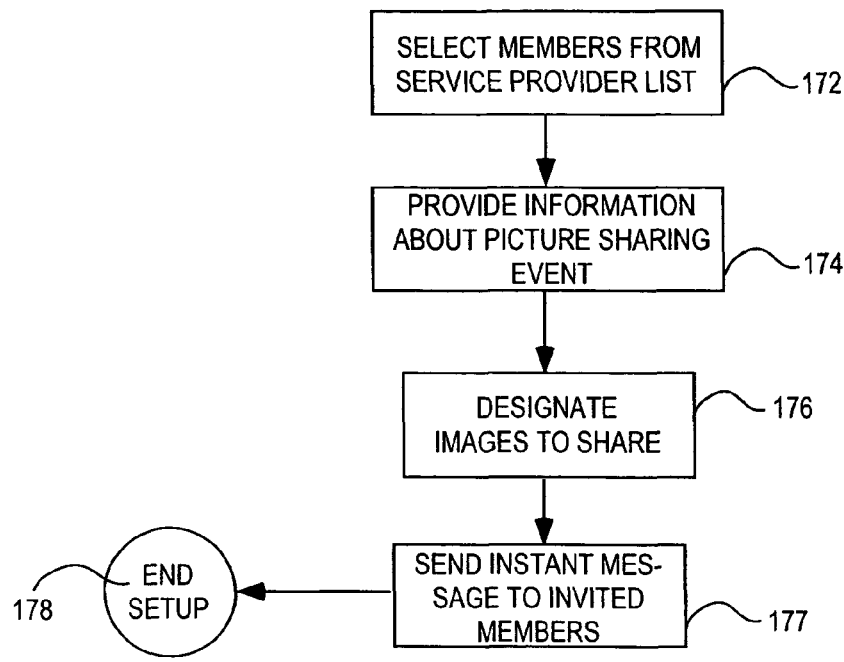
FIG. 13A is a flow chart illustrating the remaining steps necessary for the sharing software to manage the image sharing event for a community member.

FIG. 13A shows the remaining steps necessary for the sharing software to manage the image sharing event for a community member who wishes to create such an event. In step 172, a member must select other community members with whom he/she wishes to share images with. This list can be, for example but not by way of limitation, the "buddy list" as provided by AOL Instant Messenger. Such a list already establishes which members are online and their respective electronic addresses and therefore, their availability to participate in an instantaneous image sharing event. The creating member then provides information (step 174) about the event such as a theme etc. as described earlier. After providing the event information, the creating member then designates (step 176) the images that he/she wishes to share. At this point, the sharing software causes an instant message to be sent (step 177) to the invited users and the process ends in step 178 where the creating member simply waits for the images to be shared in a manner consistent with the earlier description.

Figure 13B:
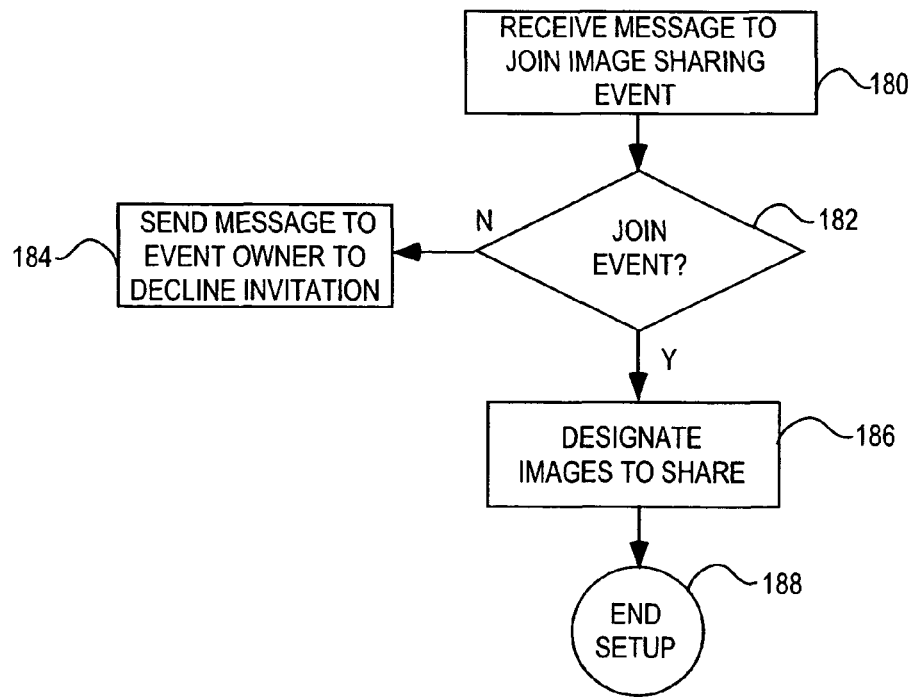
FIG. 13B is a flow chart showing the remaining steps for an invited community member to participate in an image sharing event.

FIG. 13B shows the remaining steps for an invited community member to take to participate in an image sharing event. Upon receiving an instant message (step 180) to join an image sharing event, the invited community member chooses (step 182) to join the image sharing event and designates (step 186) images to share. If the invited community member chooses not to join the image sharing event in step 182, an instant message is automatically generated to the event owner declining the invitation in step 184. At step 188 set up is complete.

Turning now to FIG. 14, there is illustrated display device 100 with a first application 102 running in the background which in this example is a word processing application. The forwarded images are displayed in a designated pattern along a path indicated by arrow 101 as described in previous embodiments with like parts indicating like operation. In this particular example, the sharing software is being used to manage a photo contest, and in particular, for tracking the user's voting for a particular images. Imagette 106 includes indicator 112 for indicating that a particular image is a significant image in terms of votes gathered by various users participating in the image sharing event. Upon selecting imagette 106 for viewing, an information window 190 is provided by the sharing software that includes a larger representation (imagette 106') of imagette 106 and a title box 192 for displaying the title of the image. Information window 190 further includes buttons 194, 196, and 198, which when actuated by the user causes their vote to be registered. A button overlay mark 200 which overlays button 198 displays to the user of the sharing software that he/she has already used their third place vote. Voting on the imagettes 106, 108, 110 etc. can be used for voting on the images as in a contest or for the person represented by the imagette or for any other dimension associated with the images forwarded to users with the sharing software. It should be noted that in this embodiment, there can be two different types of users. One group of users can choose to enter their picture into the contest and also vote for their first, second and third choices. Another group can choose to only cast votes and not enter the contest. Furthermore, the image sharing event creation can constrain the participating users to contributing only one image, for example but not by way of limitation. In this manner, large scale photo contests can be effectively managed.

Figure 15:
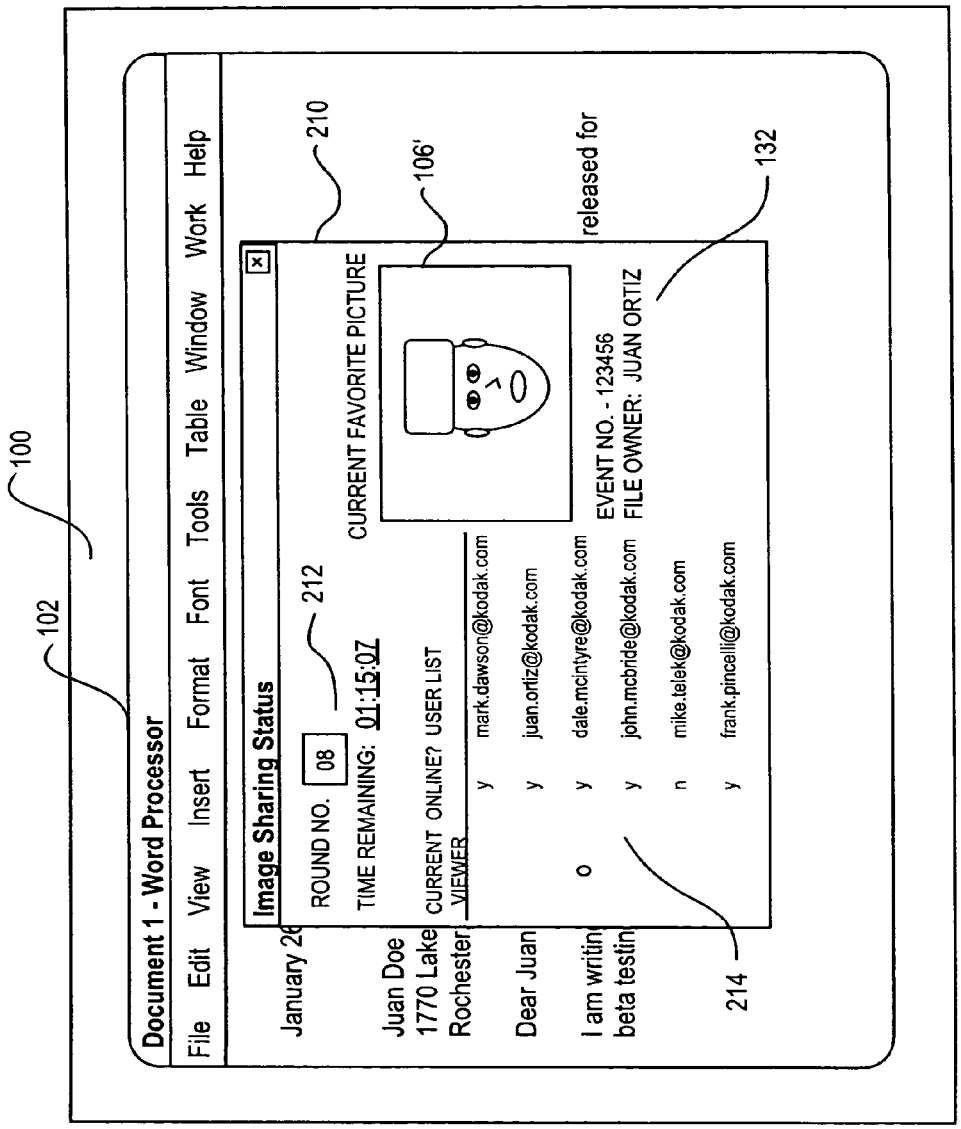
FIG. 15 illustrates another display screen of a display device used in the system according to the present invention.

Referring to FIG. 15, there is illustrated display device 100 with a first application 102 running in the background. Again in this example, a word processing application is shown as the first application 102 with like parts indicating like operation. The imagette sequence is not displayed as it is being viewed at another user's computer. As such, it is desirable for a user to determine where the imagette sequence is being viewed and other valuable information concerning the status of the image sharing event. A status window 210 can be displayed by the sharing software by the actuation of a tray icon (not shown) which is a typical implementation for software written for Windows95™, Windows98™, or any other Windows operating system offered by Microsoft Inc. While this is the preferred embodiment, the invention is not so limited. Status window 210 can be displayed using a variety of techniques specific to other operating systems in which the sharing software can run. Status window 210 includes larger imagette 106' which pursuant to the voting mechanism described with respect to FIG. 14 is the current favorite image. Image sharing event status information 212 is shown in status window 210 and includes the current round number and the time remaining in the image sharing event where the images will be forwarded in the presentation format. At the conclusion of the image sharing event, all of the images can be collected and displayed in one compilation at a web site such as Ofoto Inc. Also included in status window 210 is a user table 214 which includes all the users email addresses (or screen names), their online status, and the current viewer of the compilation of digital images. This serves to alert the waiting user as to timing of their next viewing opportunity.

Figure 16:
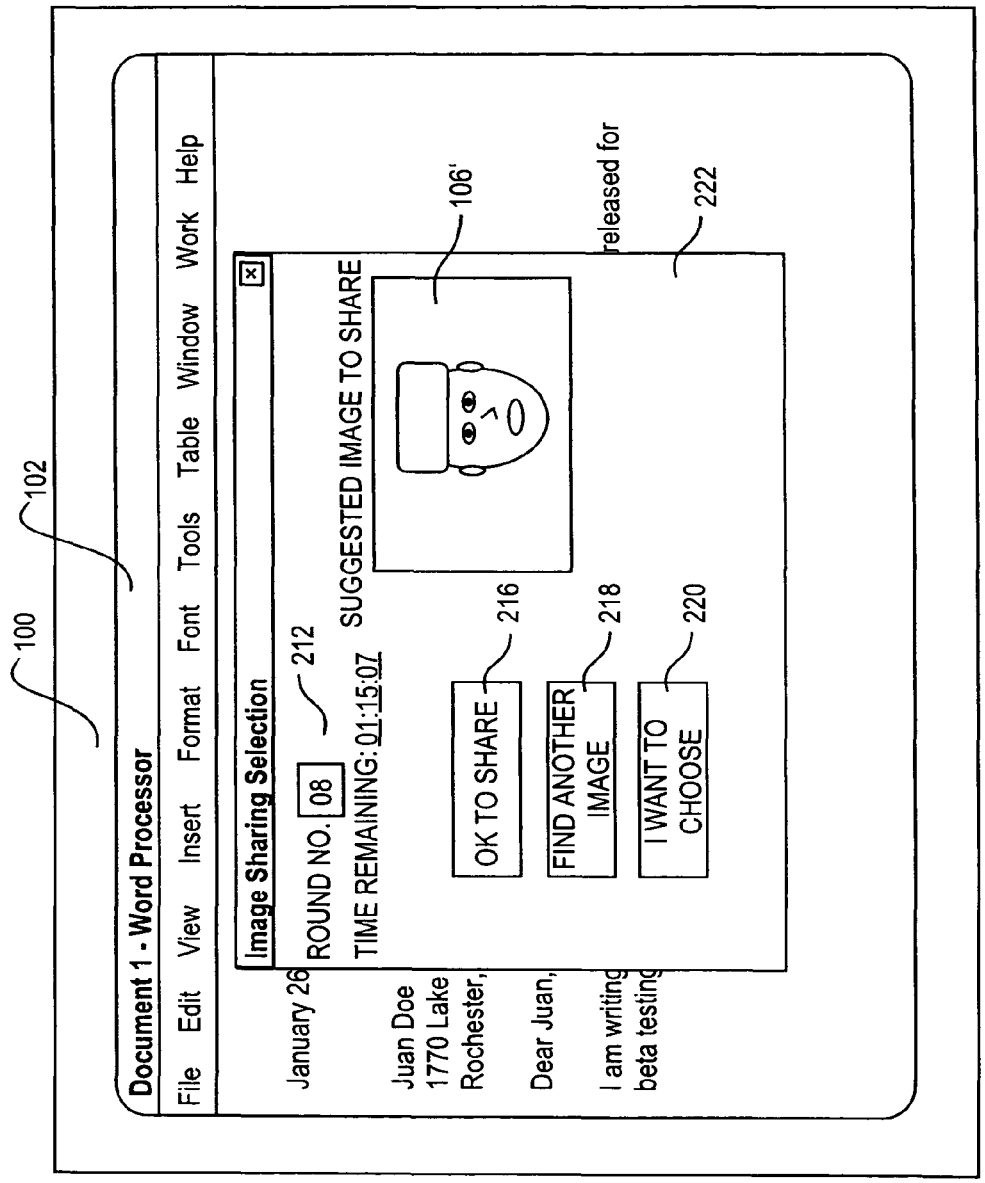
FIG. 16 illustrates another display screen of a display device used in the system according to the present invention.

Turning now to FIG. 16, there is illustrated display device 100 of a computer such as computer 17 of FIG. 10 running a first application 102 which in this example is a word processing application. In this example, image sharing software running on the computer 17 causes a window 222 to be displayed for the user alerting the user to the randomly selected image to be shared in the image sharing event. The image to be shared is represented by imagette 106' in this example. The window 222 also presents the user with multiple choices with respect to imagette 106' represented by buttons 216, 218, and 220. Selecting button 216 tells the sharing software that imagette 106' can be shared in the image sharing event defined by image sharing event status information 212. Similarly, selecting button 218 requests the sharing software to choose another random image and selecting button 220 permits the user to choose the image they wish to share.

Figure 17:
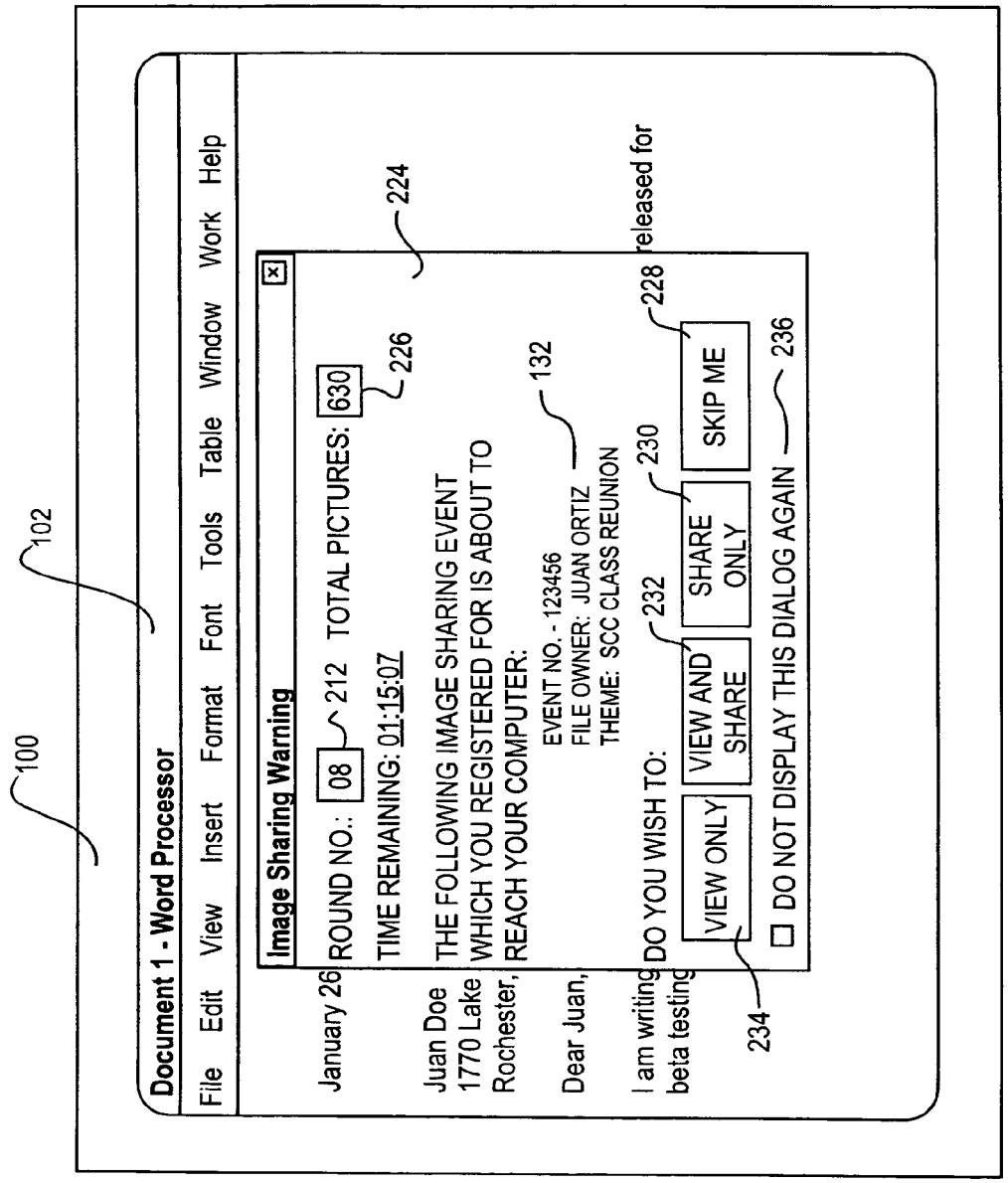
FIG. 17 illustrates another display screen of a display device used in the system according to the present invention.

Referring to FIG. 17, there is illustrated display device 100 of a computer such as computer 17 of FIG. 10 running a first application 102 which in this example is a word processing application. In this example, image sharing software running on the computer 17 causes a window 224 to be displayed which alerts the user to the impending arrival of the display of the image sharing event on user computer 17. Event information 132 identifies the content of the event to the user and the total picture count 226 informs the user of the size of the image sharing event. Based on this information, the user selects an action represented by buttons 228, 230, 232, and 234. If the user has no images to share, button 234 is selected which causes the sharing software to display the image sequence without adding an image from the user computer 17. Selecting button 228 causes the image sequence to effectively skip computer 17 being neither displayed nor added to. In the default mode represented by button 232, the image sequence is displayed and an image from computer 17 is added to the image sequence as described earlier. In a further choice, selecting button 230 causes an image from computer 17 to be added to the image sequence without the sequence being displayed on computer 17. In this mode, the user has decided to participate in sharing images without visually disrupting his/her work on computer 17. An action button 236 may also be provided requesting that the dialog not be displayed again.

Figure 18:
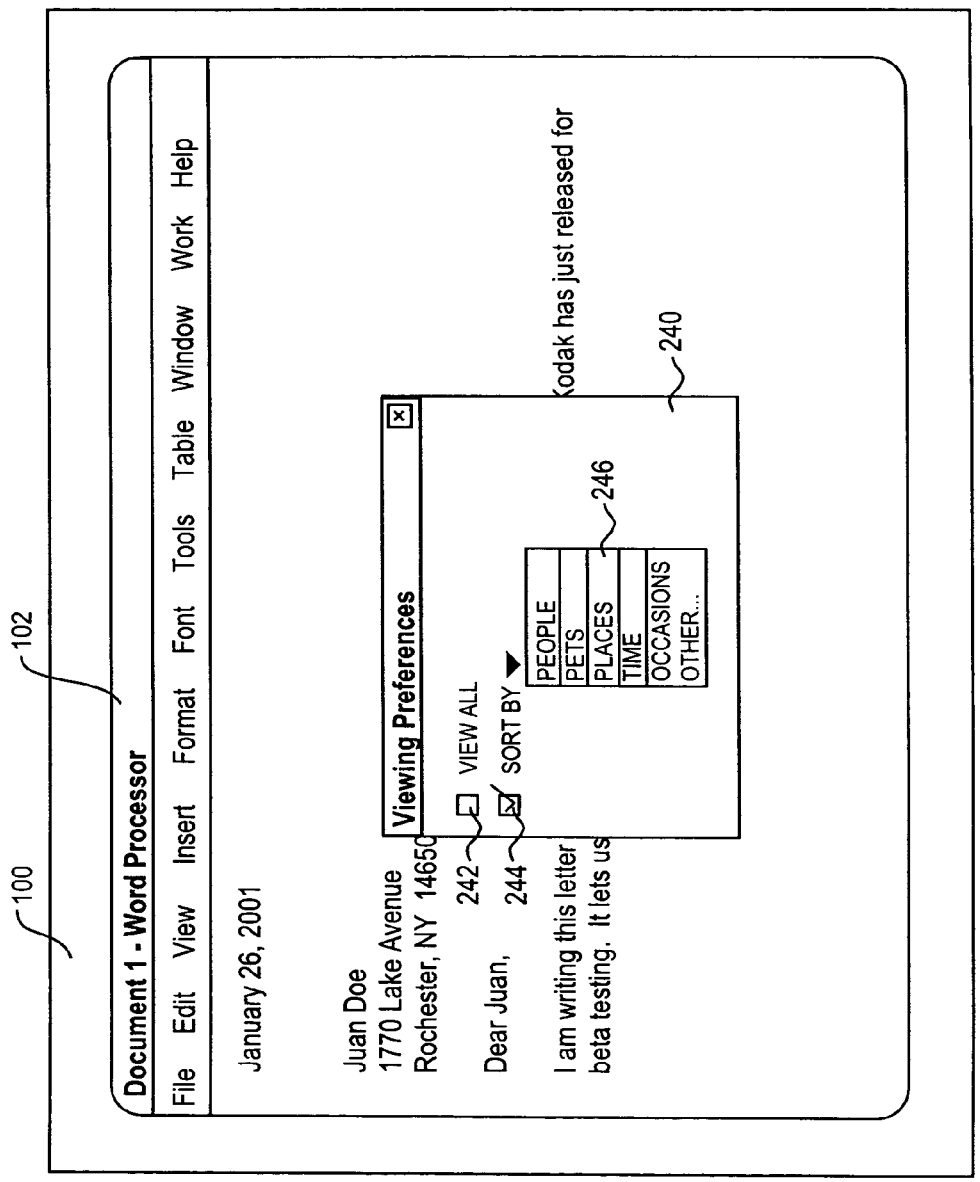
FIG. 18 illustrates another display screen of a display device used in the system according to the present invention.

Referring to FIG. 18, there is illustrated display device 100 of a computer such as computer 17 of FIG. 10 running a first application 102 which, in this example, is a word processing application. In this example, image sharing software running on the computer 17 causes a viewing preferences window 240 to be displayed which permits a user to sort the images in an image sharing event according to a selected criterion in a list 246. Criteria in list 246 can include generic categories that farther include sub-categories or the other attributes of the image sharing event. List 246 is presented to the user upon the user's selection of selection box 244. The default mode for this window 240 is to be displayed with selection box 242 pre-selected causing the sharing software to display all the images in the sequence without sorting.

Figure 19:
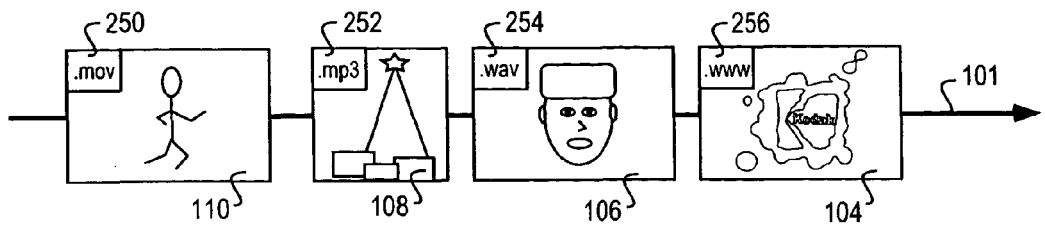
FIG. 19 is a schematic diagram illustrating how images move along a display path.

In FIG. 19, an image sequence from an image sharing event is shown and includes imagettes 104, 106, 108, and 110 following a path 101 as previously discussed. Each imagette 104, 106, 108, and 110 also includes visual indicators 250, 252, 254, and 256 respectively. Visual indicators 250, 252, 254, and 256 give a visual indication to the user of the type of file represented by the imagettes 104, 106, 108, and 110. The user selecting one of imagettes 104, 106, 108, and 110 causes the sharing software to retrieve the actual file from the computer adding the imagette. For example, visual indicator 250 indicates a file type ".mov" which is the file extension associated with Quicktime™ movie files. Similarly, visual indicator 252 indicates that imagette 108 is representing an audio file of the type ".mp3" which is a common audio file for playing music on a computer. In another embodiment, imagettes 104, 106, 108, and 110 can represent different types of news stories in a news sharing event and are provided by a content provider 306 (See FIG. 24). In this example, visual indicators 256, 254, 252, and 250 give a visual indication to the user of the type of new story portrayed by the imagettes 104, 106, 108, and 110. The user can thus select news stories to get further information about by selecting the individual imagettes 104, 106, 108, and 110 in a manner previously described.

Figure 20A:
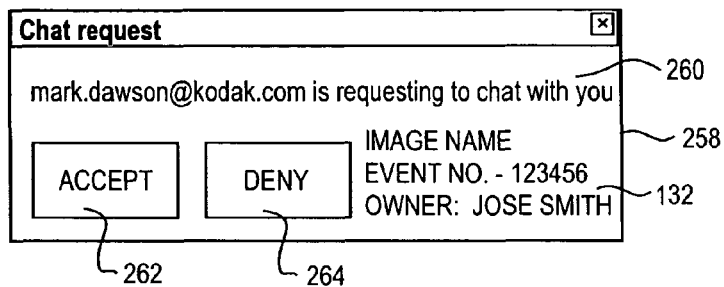
FIG. 20A illustrates a chat request window displayed on a display device used in a system according to the present invention.

In FIG. 20A, a chat request window 258 is shown that is caused by the sharing software reacting to a requesting user who has previously selected button 124 (FIG. 9). Button 124 is a request to chat with the owner (receiving user) of the picture in the image sharing event as shown in image information window 114. In this particular example, the requesting user of the chat session is identified in chat field 260. Image event information 132 along with the information in chat field 260 help the receiving user determine whether or not to chat with the requesting user. The receiving user selects button 262 to accept the request for chat or button 264 to deny the request. If the request is denied, a message (not shown) is returned to the requesting user. Otherwise in FIG. 20B, chat window 266 is provided to both users within which the dialog box 268 is displayed as is typical with chat and instant messaging systems. The imagette 106™ is further identified with image event information 132. Chat comments are added by the user typing information into chat entry box 270 followed by the selection of the send button 272. The sharing software of the receiving user can store this dialog in association with the imagette 106™.

Figure 20B:
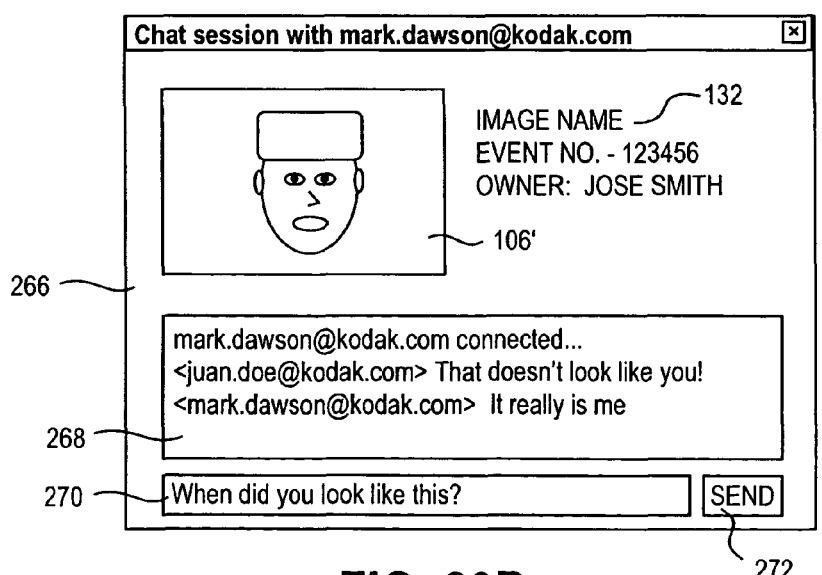
FIG. 20B illustrates a chat window displayed on a display device used in a system according to the present invention.
Figure 21:
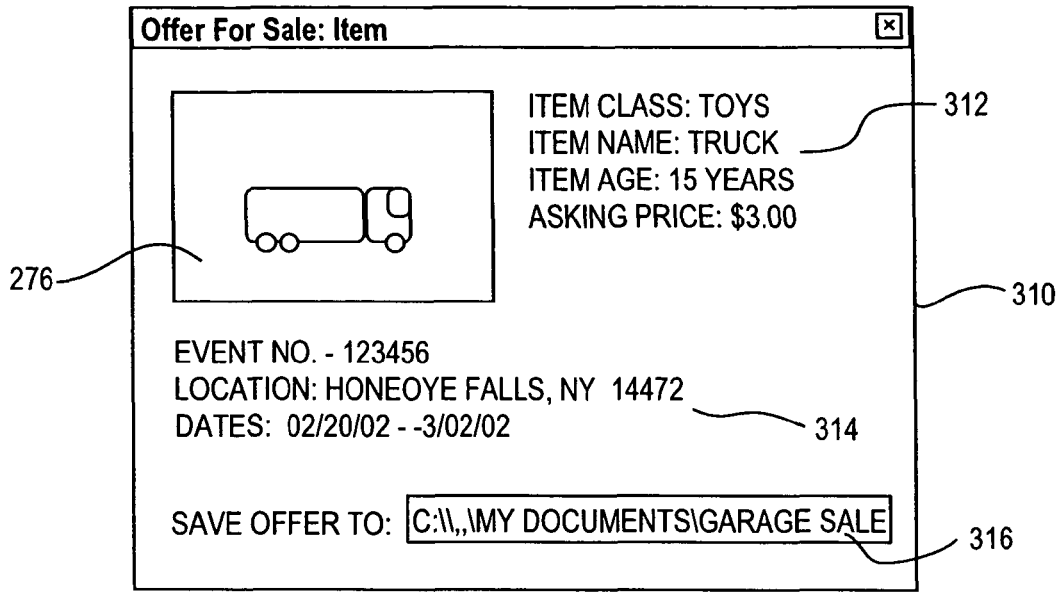
FIG. 21 illustrates a display window illustrated on a display device used in a system according to the present invention.

FIG. 21, illustrates an alternate embodiment within system 10A, 10B, 10C, or 10D of the chat session discussed with respect to FIGS. 20A and 20B. In this type of chat session, images belonging to a specific image sharing event represent items that the image owner is offering for sale. These items can be personal items offered by an individual or they can be catalog items offered by a business which will be discussed later with respect to FIG. 23. In this example, a user operating the sharing software fills out a form contained within an offer creating window 310 and provides item sale information 312 that will effectively promote the item which is being offered for sale. Also in window 310 is the appropriate sale event information 314 which is assigned by the network photoservice provider 134. The user, after providing item sale information 312, saves the offer to a location specified in a storage location box 316 on user computer 17.

Figure 22:
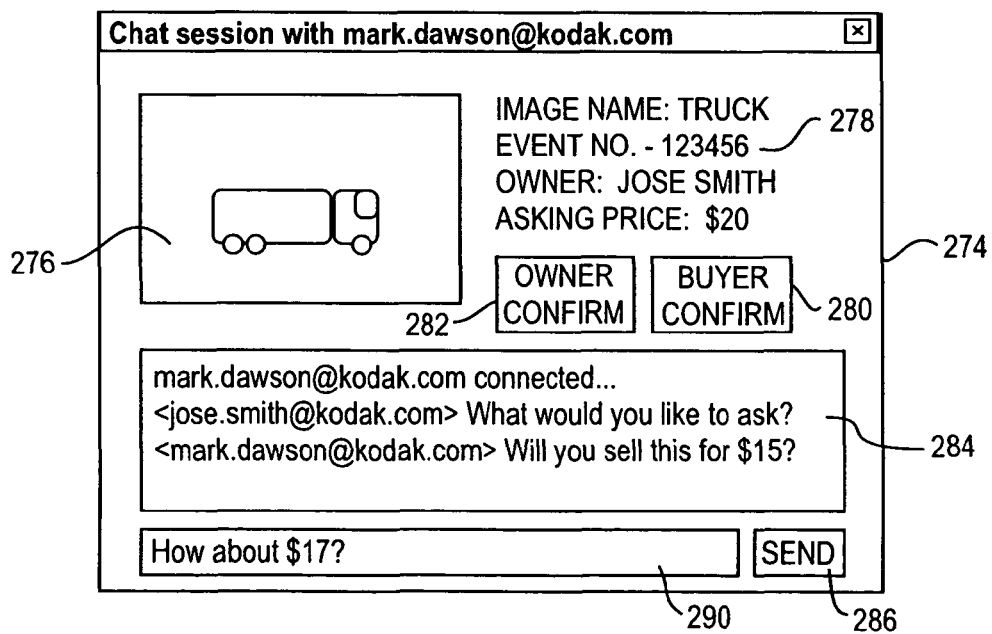
FIG. 22 illustrates a display window on a display device used in a system according to the present invention.

Turning now to FIG. 22, a negotiation chat session is occurring in a negotiating window 274 where an imagette 276 is representative of a truck that the image owner is offering for sale. Imagette 276 is part of an image sharing event as identified by the image sharing sale event information 278. Negotiation box 284 is provided for the buyer (requesting user) and the seller (receiving user) to negotiate a price for the item represented by imagette 276. The negotiation dialog box 284 can also be used for answering questions about the condition of the item, the shipping and payment requirements and any other item of interest that can be necessary to negotiate a successful deal. In this case, the content of negotiation dialog box 284 is necessary documentation that is maintained by network photoservice provider 134. A negotiating comment entry box 290 is provided for each user to enter negotiating comments into the negotiation dialog box 290. Comments entered into negotiation dialog box 290 are added to the negotiation dialog box 284 when the sending user selects the send button 286. Also included in negotiating window 274 are confirmation buttons 280 and 282 for confirming the comments in the negotiating window. Upon both parties confirming the results of the negotiations captured in the negotiating dialog box 290, the photoservice provider can supply a printed confirmation to each party and effect the transfer the funds required between the two parties to complete the negotiations based on information supplied at the point of joining the sharing event.

While the previous example was directed to selling of goods and/or services, the present invention is not so limited. For example, an individual may provide an image representative of a product that the individual wishes to purchase. The purchasing event proceeds in much the same manner as the selling event described above.

Figure 23A:
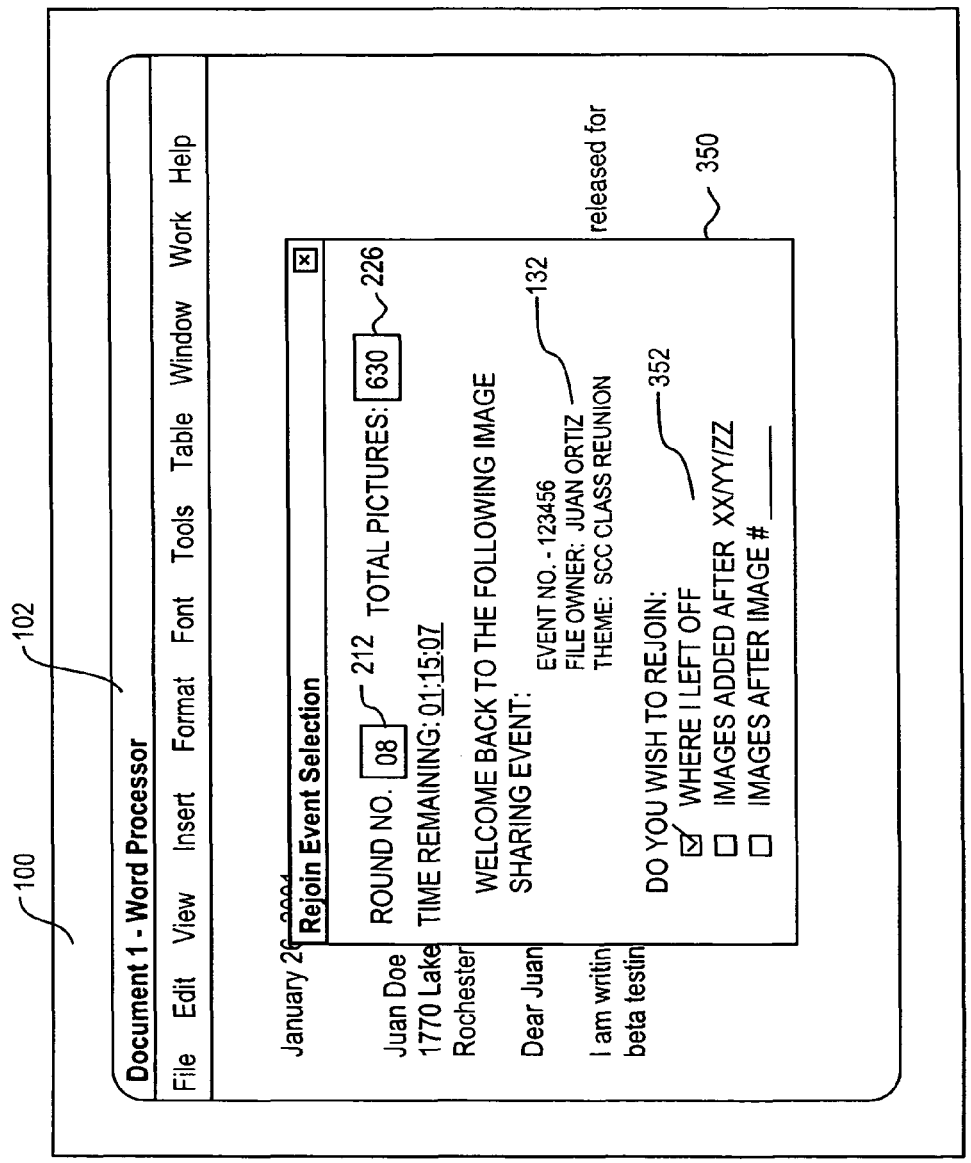
FIG. 23A illustrates another display screen of a display device used in the system according to the present invention.

As previously discussed, the image sharing event can include any desired number of images. Thus, it is possible to have hundreds and even thousands of images in the compilation of digital images that can be shared. In such a situation, a user that is on line may not be able to view all of the images in the compilation of digital images. In such a case, the controlling 14 computer can remember the last image that was viewed by the user and restart viewing of the compilation of digital images at the same point where the user left off. Here again the user would again see any additional updates that anyone has made since the compilation of digital images was last viewed in the default mode. If desired, the user who rejoins the image sharing event can select a starting point as shown in FIG. 23A. In FIG. 23A, there is illustrated display device 100 of a computer such as computer 17 of FIG. 10 running a first application 102 which in this example is a word processing application. In this example, image sharing software running on the computer 17 causes a rejoining event selection window 350 to be displayed which welcomes the user back to an event that the user had previously participated in. Event information 132 identifies the content of the event to the user and the total picture count 226 informs the user of the size of the image sharing event. Sharing software running on computer 17 stores the event information including an identifier of the last image viewed by the user. Alternatively, the network photoservice provider 134 can track this information and provide it to the sharing software when the user attempts to rejoin an event that he had previously participated in. Also provided in window 350 is a list 352 of criterion that the user can select from which determines where the user begins viewing images in the compilation of digital images being shared. In the default mode, the user begins viewing the sequence of images from the point in which he left off. Other choices include, but are not limited to, starting with a specific image, starting with images added after a specific date and/or time, or any other criterion that further includes sorting by image content (i.e. only show me the images that have dogs and were added after a specific time and date).

Figure 23B:
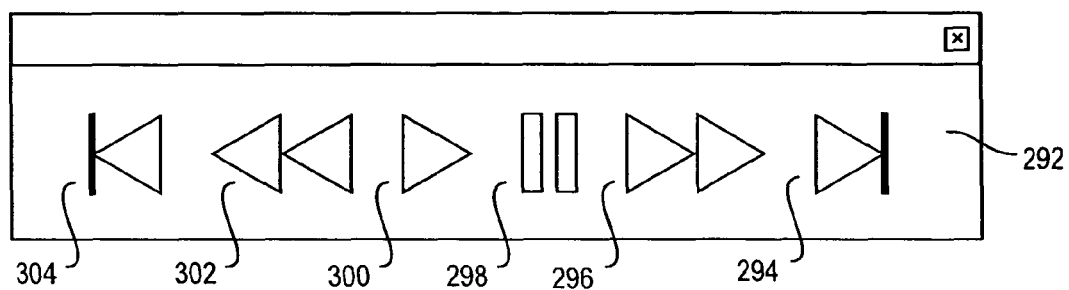
FIG. 23B illustrates a control panel for controlling viewing of the compilation of images.

In FIG. 23B, a control panel 292 is shown for controlling the viewing of the compilation of digital images. Included in the control panel 292 are control buttons 294, 296, 298, 300, 302, and 304. Control buttons 294, 296, 298, 300, 302, and 304 are used to control the flow of imagettes in the presentation format as depicted earlier in FIGS. 8A-8E. For example, control button 298 causes the image sequence to pause. Likewise, control button 302 causes the image sequence to rapidly scan backwards while actuated, and control button 296 causes the image sequence to rapidly scan forward while actuated. Control buttons 304 and 294 cause the presentation format to return to the beginning or to jump to the end of the image sequence respectively. These controls are especially useful when an image sharing event has a large compilation of digital images being shared.

Figure 27:
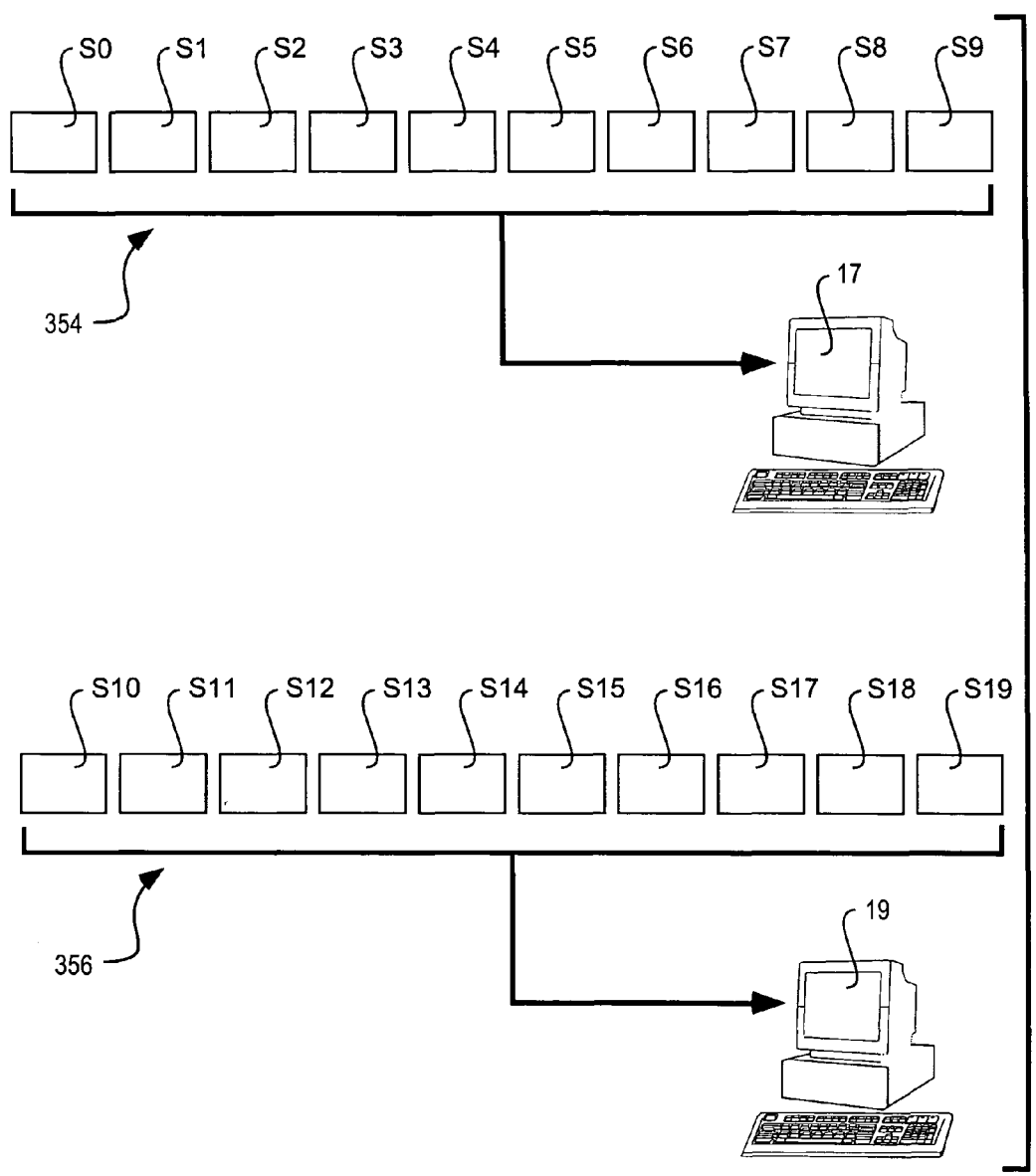
FIG. 27; illustrates a partial sequence of how images are displayed on a display device in accordance with the present invention.

Another consideration when managing an image sharing event where the compilation of digital images has a large number of digital images being shared is partitioning the viewing of the sequence of images. In a system such as system 10A, network photoservice provider 134 can implement the sharing of the compilation as previously described where the sequence of digital images is sequentially sent to users in a list. At some point, however, the time it takes to view a large number of digital images in the sequence makes the remaining users in the event list have to wait too long to view the sequence. For example, but not by way of limitation, the network photoservice provider can begin the sharing event in the manner just described by providing the whole sequence of images to each user in the event list in turn until the number of images exceeds 25 images. At this point, network photoservice provider 134 automatically switches to providing a partial sequence to several users in parallel as shown by FIG. 27. Computers 17 and 19 are a partial list of users participating in an image sharing event running on system 10A. As shown, the image sequence (S10-S19) is split into 2 partial sequences 354 and 356 wherein each partial sequence is sequentially presented to each user. In other words, the user of computer 17 is provided with a partial sequence 354 including imagettes S0-S9 while the user of computer 19 is provided with a partial sequence 356 including imagettes S10-S19. The partial sequences 354 and 356 and any subsequent user modifications made thereto are then provided to the next user in the user list. In this example, the user of computer 17 sees the partial sequence 354 followed by partial sequence 356. This parallel approach to managing the sharing of images permits all users in the event list to participate simultaneously. The partial sequences can be formed by simply dividing the total number of images by the total number of users, again after the point in which the total number of images triggers the parallel sharing approach described above.

Figure 24:
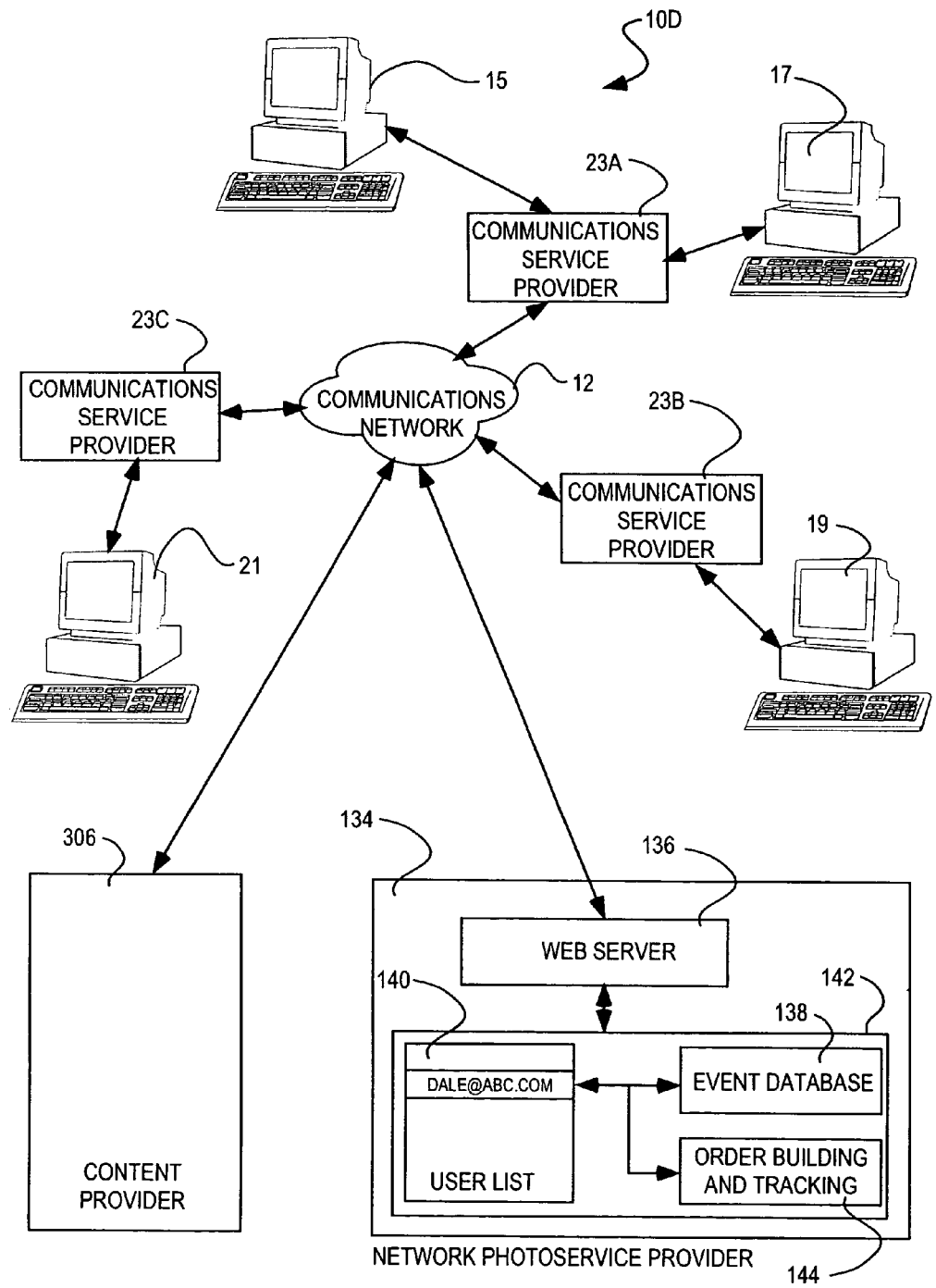
FIG. 24 is a schematic diagram of another system made in accordance with the present invention illustrating how the various users are connected together.

Referring to FIG. 24, there is illustrated a modified system 10D made in accordance with the present invention with like parts indicating like function. In this particular embodiment, content provider 306 is shown connected to the communications network 12 for providing content to the network photoservice provider 134. In this example, the content provider 306 can provide all the images being shared to the network photoservice provider 134 who manages the sharing event. As previously discussed, content provider 306 can provide news stories represented by imagettes 104, 106, 108, and 110 (See FIG. 19) in the image sequence. In this manner, content provider 306 publishes content for selection by users of computers 15, 17, 19, and 21. Users of computers 15, 17, 19, and 21 select images from the image sequence that they are interested in viewing in greater detail or are interested in seeking further information about. The network photoservice provider 134 can track various parameters such as the number of unique users participating in the event, the number of times any specific image has been accessed or selected for more information, or any other parameter of the sharing event. A report can be generated in exchange for a fee and provided to the content provider which includes statistical analysis or breakdowns of the data tracked by the network photoservice provider 134.

In an alternate embodiment, the content provider 306 provides images to the compilation of digital images that are stock images, or professional images that are available for purchase and/or printing. In a further embodiment, content provider 306 provides content relative to the theme of the sharing event that advertisements for purchasing third party goods and/or services.

Figure 25:
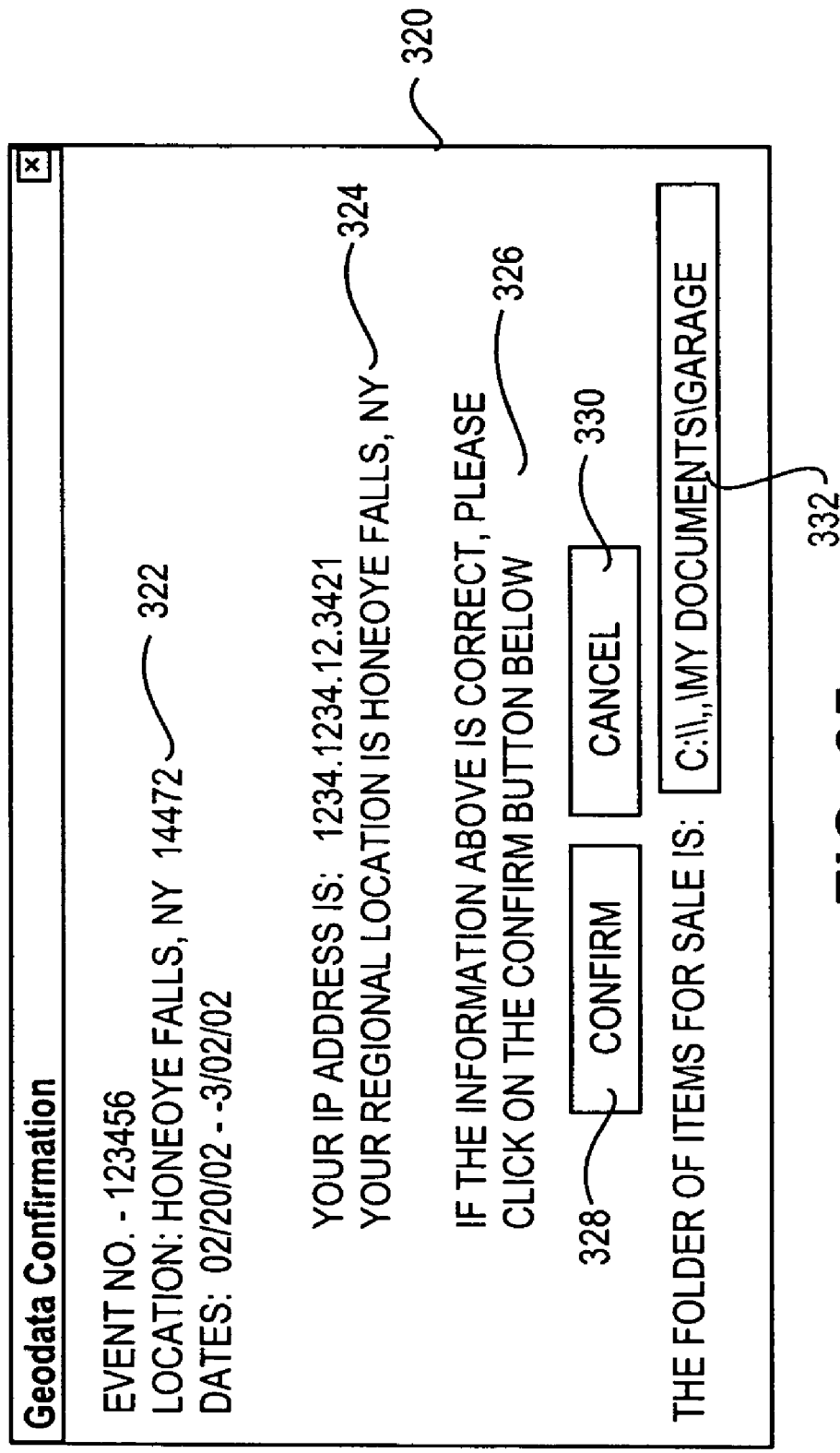
FIG. 25 is confirmation window to be displayed on a display device operating in a system according to the present invention.

Referring to FIG. 25, a geodata confirmation window 320 is shown for the purposes of confirming a user's physical locations for effecting a virtual garage sale among users in the same geographical area. Using commonly understood network route tracing techniques, a user's network connection origination or IP address is translated into a geographic area such as denoted by a certain postal code. Garage sale event information 322 is shown to the user to identify the specific event that a user is selecting to participate in. Address information 324 and instructions 326 are also included in window 320 which help direct the user to the buttons 328 and 330 for confirming the translated IP address or canceling the action respectively. Item sale folder information 332 is the designated folder or storage location for items to be offered for sale in the garage sale event. With this information, the network photoservice provider 134 or controlling computer 14 can provide a sorted event list to new users by knowing where they physically live making any transaction between buyers and sellers very convenient for pickup and delivery.

Figure 26:
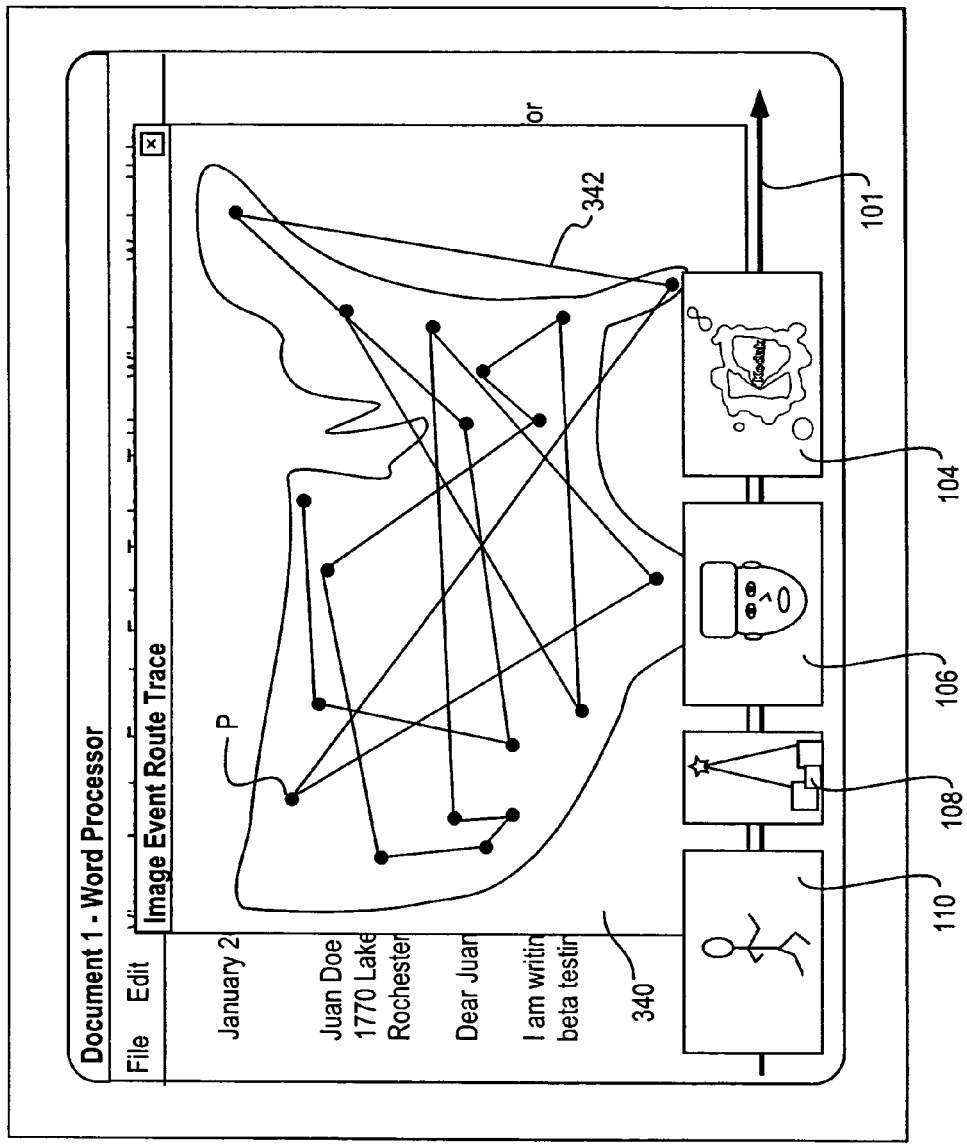
FIG. 26 illustrates another display screen of a display device used in the system according to the present invention.

Referring to FIG. 26, a display 100 displays a first application 102 running on a computer who is participating in an image sharing event open to the public. A user actuating a feature of the sharing software causes an image event route trace window 340 to be displayed. In this window 340, a visual path representation 342 is included which provides the user with a map view, in this example, that correlates to the approximate physical locations of all the users participating in the image sharing event. Each user location is denoted by a point P, and each point P is connected sequentially to the points P that immediately precede and immediately follow it. The resulting visual path representation 342 gives the requesting user an idea of how far the image sequence is traveling as it makes its way between users. The points P can change color or flash or provide any other visually distinctive and indicative technique which shows the user where the image sequence is currently being displayed. Furthermore, the sharing software can provide a hardcopy output of visual path 342 if so desired.

Figure 28:
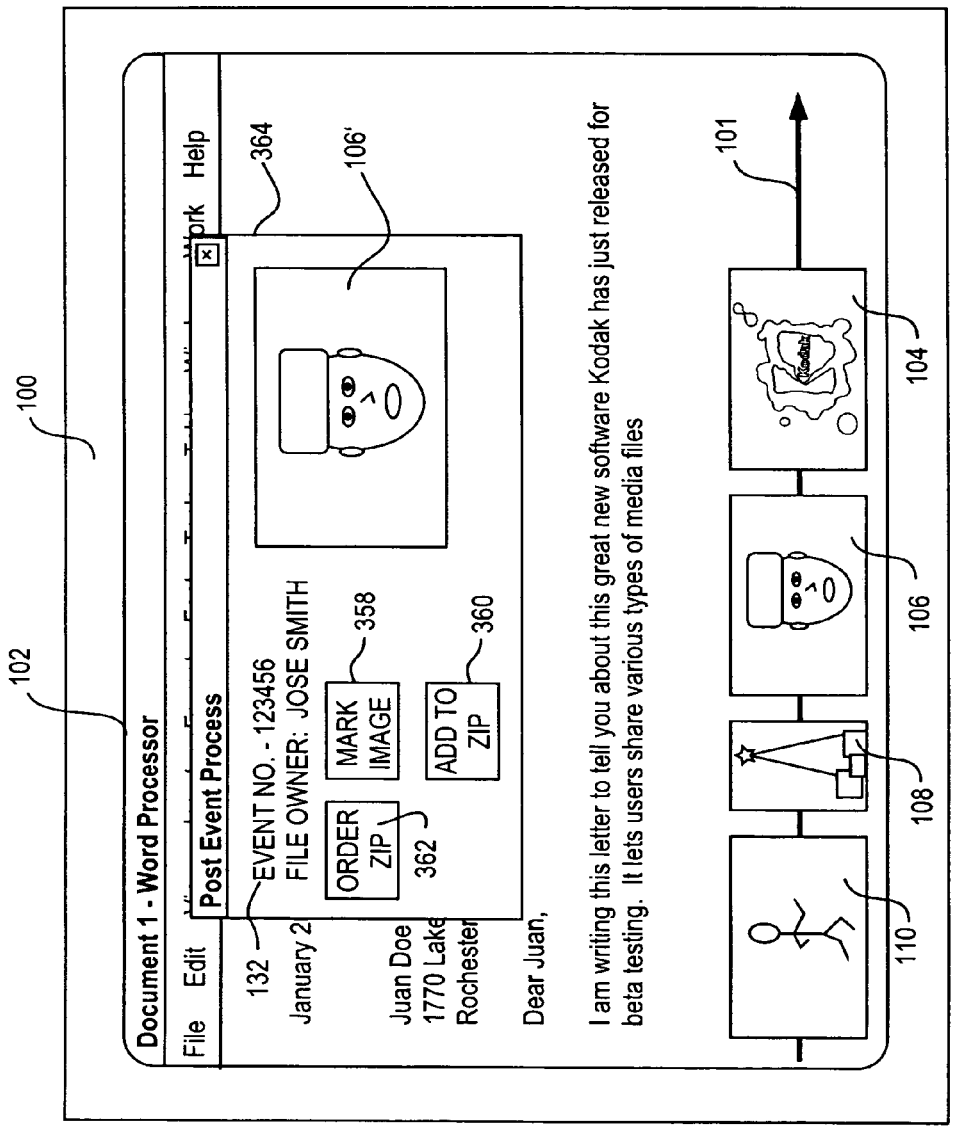
FIG. 28 illustrates another display screen of a display device used in the system according to the present invention.

Turning now to FIG. 28, a display 100 displays a first application 102 running on a computer which is participating in an image sharing event. A user actuating a feature of the sharing software causes a post event process window 364 to be displayed. Window 364 includes event information 132, an enlarged imagette 106' of selected imagette 106, a buttons 358, 360, and 362. In a image sharing event having a compilation of many hundreds of digital images, a user may wish to view the compilation a synchronously from the occurrence of the actual event. In this case, the user can supply information upon registration that he/she desires to receive a compressed compilation of digital images as an email for viewing a synchronously. A typical application for compressing a plurality of files into a single file is the well known WinZip application which produces a compressed file with a ".zip" file extension. In window 364, actuation of button 362 instructs the network photoservice provider 134 to email a compressed compilation to the requesting user. Such a compressed compilation can be provided by the network photoservice provider 134 on a periodic basis, such as once per day, if the image sharing event transpires over several days. Button 360 works in conjunction with button 358 to specify images to mark with button 358. By marking an image, a user is indicating that he/she wishes to take a future action with respect to either the marked image or the information represented by the marked image. This is useful when a user is scanning the image sequence being displayed, but doesn't have the time retrieve the related information or wants to review the related information and/or image at a future time. As is well known in the art, marking the image can be accomplished by selecting it with a right mouse click and further selecting an option from a resulting list (not shown). Button 360 permits the user to selectively request a compressed subcompilation of the compilation of digital images belonging to the image sharing event.

Figure 29:
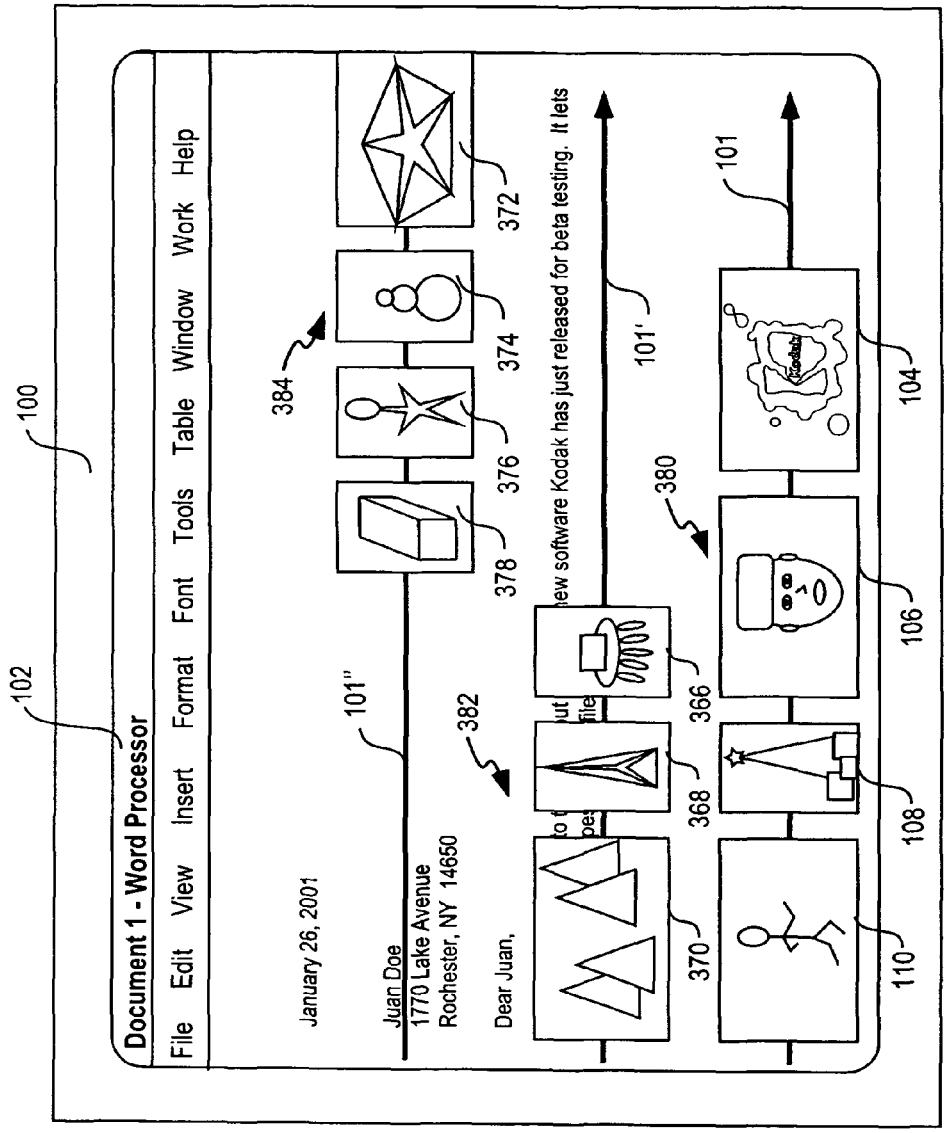
FIG. 29 illustrates another display screen of a display device used in the system according to the present invention.

Turning now to FIG. 29, a display 100 displays a first application 102 running on a computer which is participating in a plurality of image sharing events, three of which are displayed on top of the first application 102. A discussed earlier, a user can participate in multiple image sharing events and the sharing software running on user computer 17, for example, can display multiple image sequences resulting from the participation in the plurality of image sharing events. A first image sharing event 380 is shown which includes imagettes 104, 106, 108, and 110 following path 101. A second image sharing event 382 follows path 101' and includes imagettes 366, 368, and 370. Similarly, a third image event 384 is shown which includes imagettes 372, 374, 376, and 378 following a path 101". The number of concurrent image sharing events that a user can participate in is only limited by the size of the display before more image sharing events begin to visually overlap on the display screen 100 and obscure the user's ability to effectively participate in the image sharing event.

Figure 30:
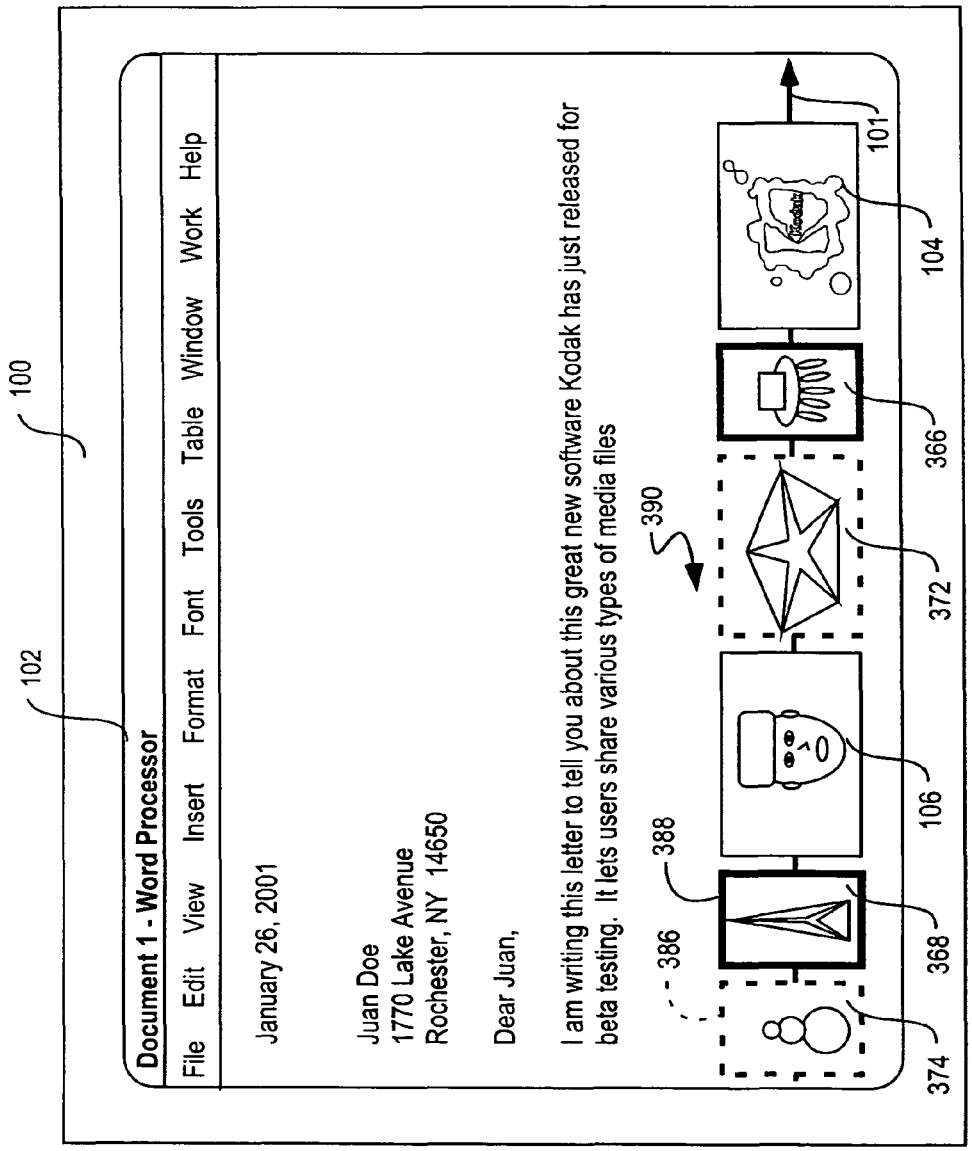
FIG. 30 illustrates another display screen of a display device used in the system according to the present invention.

Referring to FIG. 30, there is shown a integrated image sharing event 390 with an interleaved presentation format for displaying a plurality of concurrent image sharing events. Integrated image sharing event 390 includes imagettes 104, 366, 372, 106, 368 and 374 following path 101. The sharing software on computer 17, for example, can provide the interleaved presentation format to permit the user to optimize the working area of the display screen 100. To distinguish which images belong to which image sharing event, the sharing software provides visual framing indicators 386 and 388. While shown as heavier framing lines and including dashed lines, any visually distinguishing characteristic can be used and considered within the scope of the invention. For example but not by way of limitation, the color of the frame may be specific to a particular image sharing event.

It is to be understood that various other modifications and changes may be made without departing from the scope of the present invention. The present invention being limited by the following claims.

PARTS LIST

10 System
10A System
10B System
10C System
10D System
12 Communication network
14 Computer
15 Computer
16 Computer
17 Computer
18 Computer
19 Computer
20 Computer
21 Computer
23A Communication Ser vice Providers
23B Communication Service Providers
23C Communication Service Providers
46 Step
48 Step
50 Step
52 Step
54 Step
56 Step
58 Step
59 Step
60 Step
61 Step
62 Step
64 Step
66 Step
68 Step
70 Step
72 Step
74 Step
76 Step
80 Step
82 Step
84 Step
86 Step
88 Step
92 Step
94 Step
95 Step
96 Step
97 Step
98 Step
100 Display Device
101 Arrow
101' Path
101" Path
102 Primary Application Window
103 Arrow
104 Imagette
105 Arrow
106 Imagette
106' Imagette
108 Imagette
110 Imagette
112 Indicator
114 Information Display Box
116 Comment Box
118 Add Button
120 Comment Entry Box
124 Button
125 Button
126 Button
127 Button
128 Button
130 Button
132 Image Specific Information
134 Network Photoservice Provider
136 Web Server
138 Database
140 User List
142 Computer
144 Tracking Block
146 Third Party Fulfillment Provider
148A Communication Service Provider
148B Communication Service Provider
148C Communication Service Provider
148D Communication Service Provider
150 Computer
152 Internet Capable Web Phone
154 Personal Digital Assistant
156 Television System
160 Computer
162 Computer
164 Computer
166 Computer
170 Online Communication Service Provider
172 Step
176 Step
177 Step
178 Step
180 Step
182 Step
184 Step
186 Step
188 Step
190 Information Window
192 Title Box
194 Button
196 Button
198 Button
200 Button Overlay Mark
210 Status Window
212 Image Sharing Event
214 User Table
216 Button
218 Button
220 Button
222 Button
224 Display Window
226 Total Picture Count
228 Button
230 Button 232 Button
234 Button
236 Button
240 Viewing Preferences Window
242 Selection Box
244 Selection Box
246 List
250 Visual Indicator
252 Visual Indicator
254 Visual Indicator
256 Visual Indicator
258 Chat Request Window
260 Chat Field
262 Button
264 Button
266 Chat Window
268 Dialog Box
270 Chat Entry Box
272 Send Button
274 Negotiating Window
276 Imagette
278 Image Sharing Sale Event Information
280 Confirmation Button
282 Confirmation Button
284 Negotiation Box
286 Send Button
290 Negotiating Dialog Box
292 Control Panel
294 Control Button
296 Control Button
298 Control Button
300 Control Button
302 Control Button
304 Control Button
306 Content Provider
310 Window
312 Item Sale Information
314 Appropriate Sale Event Information
316 Storage Location Box
320 Geodata Confirmation Window
322 Garage Sale Event Information
324 Address Information
326 Instructions
328 Buttons
330 Buttons
332 Item Sale Folder Information
340 Image Event Route Trace Window
342 Visual Path Representation
350 Window
352 List
354 Partial Sequence
356 Partial Sequence
358 Button
360 Button
362 Button
364 Process Window
366 Imagettes
368 Imagettes
370 Imagettes
372 Imagettes
374 Imagettes
376 Imagettes
378 Imagettes
380 First Image Sharing Event
382 Second Image Sharing Event
384 Third Image Sharing Event
386 Visual Framing Indicators
388 Visual Framing Indicators
390 Integrated Image Sharing Event

What is claimed is:

1. A method for setting up a system for sharing images among a plurality of users in a first image sequence, comprising:
providing a plurality of digital images to a controlling computer having software for controlling the sharing of said plurality of digital images between a plurality of designated users in a first image sequence;
providing a list of electronic addresses of said plurality of designated users;
forwarding an invitation to said plurality of designated users in said list for gaining access to said plurality of digital images over a communication network by said controlling computer;
forwarding user software to said designated users that accept said invitation; and
automatically controlling the forwarding of said plurality of digital images in a predetermined sequence between said designated users that accepted said invitation by said controlling computer.

2. A method according to claim 1 wherein said designated users that receive said plurality of digital images having the ability to add digital images and/or comments with respect to plurality of digital images that can be seen by said designated users that view said plurality of digital images at a later point in time so as to create a new image sequence.

3. A method according to claim 2, wherein said designated users can, without viewing said plurality of digital images in said predetermined sequence, retain the ability to add a digital image to said plurality of digital images that can be seen by said designated users that view said plurality of digital images at a later point in time so as to create a new image sequence.

4. A method according to claim 1 wherein said digital images are displayed in a presentation format on a display device of a computer such that another task may be viewed and/or interacted with on said display device without interrupting the presentation format of the digital images.

5. A method according to claim 4 wherein said presentation format comprises a plurality of imagettes that are located along at least a portion of the peripheral area of said display device.

6. A method according to claim 1 wherein said controlling computer is operated by one of said plurality of users.

7. A method according to claim 1 wherein said controlling computer is operated by a service provider.

8. A method according to claim 1 wherein said sharing is initiated by an initiator.

9. A method according to claim 1 wherein said initiator controls what may be shared among said plurality of users.

10. A method according to claim 9 wherein said initiator and/or a user designated by the initiator may ban a user from said plurality of designated users.

11. A method according to claim 1 wherein said compilation of digital images corresponds to a selected theme.

12. A method according to claim 1 wherein additional data may be associated with any of said images of said compilation.

13. A method according to claim 12 where said additional information is related to said associated image.

14. A method according to claim 13 where said additional data comprises sound.

15. A method according to claim 1 wherein said compilation is presented to each of said users in a preselected pattern.

16. A method according to claim 14 wherein said preselected pattern comprises scrolling said compilation of images on said display device being used by said user.

17. A method according to claim 1 wherein said user display device is controlled by a computer, said compilation is scrolled across said display device.

18. A method according to claim 17 wherein said user display device is controlled by a computer, said compilation is presented atop another program being run by said computer.

19. A method according to claim 1 further comprising the step of said user making an inquiry with respect to one of said images of said compilation.

20. A program storage device readable by a computer, tangibly embodying a computer software program having instructions executable by the computer for sharing images over a communication network, said computer software program when loaded onto a computer will cause said computer to perform the steps of:

a. providing a plurality of digital images to a controlling computer having software for controlling the sharing of said plurality of digital images between a plurality of designated users in a first image sequence;

b. providing a list of electronic addresses to said plurality of designated users;

c. forwarding an invitation to said plurality of designated users for gaining access to said plurality of digital images over a communication network by said controlling computer;

d. forwarding user software to said designated users that accept said invitation; and e. automatically controlling the forwarding of said plurality of digital images in a predetermined sequence between said designated users that accepted said invitation by said controlling computer.

* * * * *